United States Patent
Kishan et al.

(10) Patent No.: US 8,091,088 B2
(45) Date of Patent: Jan. 3, 2012

(54) METHOD AND SYSTEM FOR HIERARCHICAL RESOURCE MANAGEMENT INVOLVING HARD AND SOFT RESOURCE LIMITS

(75) Inventors: Arun Kishan, Redmond, WA (US); David B Probert, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1624 days.

(21) Appl. No.: 11/064,141

(22) Filed: Feb. 22, 2005

(65) Prior Publication Data

US 2006/0190482 A1  Aug. 24, 2006

(51) Int. Cl.
*G06F 9/46* (2006.01)
(52) U.S. Cl. ...................................................... 718/104
(58) Field of Classification Search .................... 718/104
See application file for complete search history.

(56) References Cited

U.S. PATENT DOCUMENTS

| | | | | |
|---|---|---|---|---|
| 6,301,616 B1* | 10/2001 | Pal et al. | | 709/226 |
| 6,601,083 B1* | 7/2003 | Reznak | | 718/104 |
| 6,799,208 B1* | 9/2004 | Sankaranarayan et al. | | 709/223 |
| 6,859,926 B1* | 2/2005 | Brenner et al. | | 718/100 |
| 7,032,222 B1* | 4/2006 | Karp et al. | | 718/104 |
| 7,353,515 B1* | 4/2008 | Ton et al. | | 718/102 |
| 2003/0167329 A1* | 9/2003 | Kurakake et al. | | 709/226 |

OTHER PUBLICATIONS

"ARMTech for Windows: Server Edition," *Aurema,* <.aurema.com.au/products/winserver.php?pf=true> [retrieved Dec. 6, 2004].
"Solaris Resource Manager™ 1.1 White Paper: Consolidate Servers and Increase Resource Utilization," *Sun® Microsystems,* <.sun.com/software/> Sep. 1999, 23 pages.
"Windows Server™ 2003: Windows System Resource Manager (WSRM) White Paper: An Overview of the WSRM Command-Line Interface," published Aug. 2003, 10 pages.
"Windows Server™ 2003: Windows System Resource Manager (WSRM) White Paper: Windows System Resource Manager Accounting," published Oct. 2003, 30 pages.
"Windows Server System™: Windows System Resource Manager Frequently Asked Questions," published Sep. 3, 2003, <.microsoft.com/windowsserver2003/techinfo/overview/wsrmfaq.mspx?pf=true> [retrieved Dec. 6, 2004].

* cited by examiner

*Primary Examiner* — Emerson Puente
*Assistant Examiner* — Gregory Kessler

(57) ABSTRACT

The present invention manages resources in a computing device to facilitate the allocation of resources amongst competing clients operating on the device. A hierarchy of budgets is constructed to encode restrictions on the aggregated use of a resource allocated by a resource provider to one or more clients. A resource manager validates and arbitrates requests to allocate resources to the one or more clients by resource providers in accordance with the budgets comprising the hierarchy. The resource manager notifies clients of availability and shortages of resources to promote compliance with the restrictions encoded in the budgets of the hierarchy.

20 Claims, 11 Drawing Sheets

METHOD AND SYSTEM FOR HIERARCHICAL RESOURCE MANAGEMENT INVOLVING HARD AND SOFT RESOURCE LIMITS

TECHNICAL FIELD

In general, the present invention relates to resources in a computing device and, more particularly, to managing resources in a computing device.

BACKGROUND

Operating systems employ resource management schemes to limit the interference between applications, implement policies that prioritize and otherwise control resource allocations, and generally manage the overall behavior of a system that is running many independent software applications.

Existing resource management schemes are largely first-come, first-served. Counter-based resource management schemes, such as those used in the Digital VAX/VMS, the BSD/UNIX, and the WINDOWS NT operating systems, attempt to maintain an absolute count of resource use by one or more processes. Counters may track, for example, kernel memory utilization, Central Processor Unit (CPU) utilization, or Input/Output (I/O) data transfers.

One of the problems with counter-based resource management schemes is determining what the limits are and the consequences of reaching or exceeding the limits. More often than not, the limit is simply raised when it is reached. In the context of the WINDOWS operating system, setting limits on the use of certain resources is generally achieved through mechanisms such as job objects, kernel quotas, CPU affinities, and various ad hoc resource-specific limits. Resource use can also be capped along functional lines, as, for example, when the memory manager caps the use of kernel virtual address space based on how it is to be used. Another example is when the use of kernel pool by the Transmission Control Protocol/Internet Protocol (TCP/IP) is dynamically capped based on the type of packet that is currently being transmitted, e.g., a packet representing voice data might have a higher cap on the use of kernel pool than a packet that does not in order assure a quality voice transmission.

In some cases, resource management schemes are based on setting relative priorities of the processes competing for the resources to aid in arbitrating resource contention, as is currently done, for example, in the scheduling of CPU resources. In addition, resource management schemes may be based on privileges, i.e., requiring processes to have privileges to carry out certain operations to effect the allocation of resources, as is currently done, for example, by requiring a process to have the privilege to lock physical pages in memory.

There are several problems with existing resource management schemes. As most resources are system-wide, managing resources on a first-come/first-served basis can lead to denial of service problems. This is because resources may be subject to unbounded consumption by other applications, other users, or network-visible services. Reliance on the existing mechanisms creates an unpredictable environment in which applications often cannot acquire the resources needed to run because errant, selfish, or malicious applications have already absconded with them. The problem is particularly acute in large terminal services machines.

Priority-based resource management schemes only worsen the competition. Since applications cannot independently establish their priority relative to other applications, it is generally not possible to set priorities to share the resource fairly. In most cases, it is not even possible to define priorities fairly. In the case of CPU resources, this often leads to applications artificially boosting their priorities to ensure access regardless of the demands present elsewhere. The end result is that applications will compete at the inflated priority level, nullifying any fairness policy the priority scheme was aiming to accomplish.

With no limits on resource competition, it is very difficult to provide pre-defined levels of service to specific applications. An administrator or service provider generally cannot specify either a minimum or maximum amount of resources for an application. This presents problems in server consolidation scenarios, and forces the administrators and service providers to support consolidation by, for example, dynamically adjusting priorities to manage CPU utilization by specific applications.

Some systems have attempted to overcome some of the problems inherent in resource management through the use of resource guarantees. Instead of just setting limits or priorities, applications may contract for implicitly allocated resources upfront. Guarantees eliminate instantaneous competition for resources by adding a layer of indirection between requesting a resource and actually using it. By explicitly reserving resources in a first-come/first served manner, a client obtains a contract regarding future use of the resource (e.g., guaranteed I/O latency), regardless of any other outstanding guarantees. Bandwidth is one example where resource guarantees are particularly important for the implementation of multimedia applications. However, guarantees themselves are resources and allocation of guarantees may fail.

As personal computers move into the living room and take on many new roles, resource management becomes more important, particularly when managing conflicts in resource usage. In addition, server computers need to manage resources more effectively in order to provide a more predictable operational environment.

SUMMARY

The foregoing problems with the prior state of the art are overcome by the principles of the present invention, which is directed toward methods, systems, computer program products, and data structures for managing resources in a computing device. The present invention is further directed toward methods, systems, computer program products, and data structures for managing resources in a computing device to facilitate the allocation of resources amongst competing processes or threads operating on the device.

According to one aspect of the invention, a budget encodes resource requirements and restrictions for one or more clients. Any number of processes, threads, or a combination thereof, executing on behalf of a client may be associated with a single budget. A particular process or thread may also be associated with multiple budgets, but is subject to only one budget at any instant in time. The processes and threads compete for resources based on, among other considerations, the requirements and restrictions encoded in the active budget.

In accordance with yet another aspect of the invention, the active budget for a particular process or thread may change numerous times over the course of its lifetime, depending, at least in part, on the client on whose behalf the process or thread is executing. In the case of a service process that is performing a service for one or more clients on a set of concurrently executing threads, the client on whose behalf the process or thread is currently executing may be determined using resource-client identity impersonation. Resource-client identity impersonation temporarily associates a process or thread with a client by assuming the client's resource-identity to locate and temporarily attach to the client's active budget. Typically, this is accomplished by examining the active budget for the current client thread.

According to another aspect of the invention, the budget encodes resource requirements and restrictions for the client (or clients) associated with the budget, at least in part, by maintaining one or more of three quantities for each resource supported for the client(s), the quantities indicating a limit, "L," a reservation, "R," and a commit, "C."

According to one aspect of the invention, the budget limit, "L," represents a maximum on the amount of a resource that the client(s) associated with the budget can obtain from the provider of the supported resource, i.e., the resource provider. Limits may be either hard or soft, a distinction that dictates the appropriate behavior when the threshold is reached. If the limit is hard, it is an absolute maximum and may be enforced by taking one or more actions, such as failing requests to allocate the resource or employing rate-control. However, if a limit is soft, then the limit only serves as an advisory to the relevant resource provider in deciding whether or not to fulfill a client's request to allocate the resource. Typically, the resource provider makes a determination whether to provide soft resource allocation based on resource utilization level and whether the allocation can be reclaimed when needed with minimal performance overhead.

According to one other aspect of the invention, the budget reservation, "R," represents a pre-allocation of a resource that ensures that future requests to allocate the resource on behalf of a client up to the amount of the reservation, "R," will likely succeed, also referred to herein as a guarantee. The budget reservation "R," is constrained by the budget limit "L," whether the limit is hard or soft. The budget reservation "R," may further represent a sufficient amount of the resource to span multiple allocations, each allocation carving out a portion from the budget reservation.

According to one other aspect of the invention, the budget commit, "C," represents the amount of a resource that a resource provider has thus far allocated to the client(s) with which the budget is associated. Like the reservation value, the budget commit, "C," is constrained by the budget limit "L," whether the limit is hard or soft. In addition, the budget commit, "C," may exceed the reservation value "R."

According to still another aspect of the invention, a budget hierarchy links together the resource requirements and restrictions encoded in separate budgets. Budgets in a budget hierarchy are organized in an n-ary tree format, with each budget object having at most one parent and an unbounded number of children. As such, a budget hierarchy may be considered to have a single root budget which has no parent. Clients associated with a child budget in a budget hierarchy are also subjected to the resource limit "L," of a parent budget, including the root budget. A parent budget may function as the default active budget unless a child budget is not explicitly created. The limit imposed on the client is the more restrictive of the limits maintained in the child and parent budgets, referred to herein as the effective resource limit.

According to yet another aspect of the invention, budget hierarchies may be external or internal. External budget hierarchies may be explicitly constructed in advance of their use based on policy considerations. Internal budget hierarchies may be dynamically constructed by a client attempting to self-manage resource consumption by the threads and processes executing on its behalf. A client may be permitted to escape from the budget hierarchy of which its currently active budget is a part if it has sufficient privileges, for example, to subject an application to a policy other than that encoded in the current budget. An application that needs to limit the resources available to a new process can create a child budget in order to contain potentially malicious or dangerous behavior.

According to one other aspect of the invention, additional limits may be encoded in a budget or elsewhere to dynamically change the resource restrictions imposed on a client based on how the client is using the resource. A client's use of a resource may vary over time, depending on modes of operation and the like. The client defines the additional limits by the types of use, and communicates the current use of the resource by indicating an active flavor. The active flavor is one of a plurality of flavors that represent the various uses to which a resource may be put. In this manner, clients, within the constraints imposed by their associated budgets, may partition their use of resources based on the type of use. Typically, the active flavor can be communicated to the resource manager explicitly, for example, by passing it as a parameter to a resource allocation API, or implicitly, for example, by setting the active flavor into the user-mode and/or kernel-mode memory state for the client.

According to still another aspect of the invention, the resources that may be supported in a budget include discrete, rate-based, and guaranteed resources. A discrete resource is a resource that is allocated to a client for exclusive use by the process or thread executing on its behalf. Discrete resources include resources that are constrained by actual physical limitations on the operating system, or by artificial limitations imposed by the design of the operating system. Rate based resources include usage patterns of any discrete resource with respect to time, such as the rate of CPU consumption, I/O or network bandwidth, and the like. Guaranteed resources may be associated with either or both discrete resources and rate-based resources. A guaranteed resource serves as a voucher for the future availability of a resource up to a designated amount.

According to still another aspect of the invention, the clients for which resources may be managed may include applications or groups of applications. A client may optionally function as a budget manager having privileges to encode resource requirements and policy rules in a budget on behalf of other clients.

According to yet another aspect of the invention, a resource manager centralizes the administration of resources, including implementing the budgets, monitoring available resources, and recovering from resource allocation failures. The resource manager may further provide interfaces to specify budget constraints and communicate with resource providers. A resource manager may validate resource allocation requests forwarded from resource providers on behalf of clients in accordance with a dynamic policy state. The dynamic policy state represents the current state of resource management policy, including the identification of currently executing processes and threads, their relative importance, as might be indicated, for example, by a priority level, and their currently active budgets. The resource manager further arbitrates conflicts between a requesting client and a target client in accordance with an allowed action set specified for processes and threads executing on behalf of the target client in the dynamic policy state. The allowed action set ranges from passive actions for the target client to voluntarily cede resources for reallocation to a requesting client, pro-active actions to forcibly reclaim resources from a target client, and aggressive actions that result in terminating the target client from which resources are reclaimed. The resource manager may optionally enforce rate control of a resource on behalf of a resource provider.

According to one other aspect of the invention, resource providers allocate resources to requesting clients and reclaim resources from target clients separately from, but in accordance with, the resource manager's validation and arbitration determinations. As resources are allocated and reclaimed, the resource providers further interact with the clients' budgets directly or indirectly in cooperation with the resource manager, to record the consumption and release of supported resources.

According to still another aspect of the invention, resource notification services are provided to facilitate notifications regarding a resource to requesting and target clients from resource providers and the resource manager. Notifications include, among others, notifications related to resource arbitration and notifications that resource usage has reached or exceeded a threshold.

In accordance with yet other aspects of the present invention, a computer-accessible medium for managing resources in a computing device is provided, including a medium for storing data structures and computer-executable components for creating, maintaining, and querying budgets, reserving and managing resources, recording consumption of resources, and arbitrating resource conflicts. The data structures define the resources and resource providers, budgets, and other policy data in a manner that is generally consistent with the above-described systems and methods. Likewise, the computer-executable components, including the resource manager and resource manager interfaces to the budgets and resource providers, are capable of performing actions generally consistent with the above-described systems and methods.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
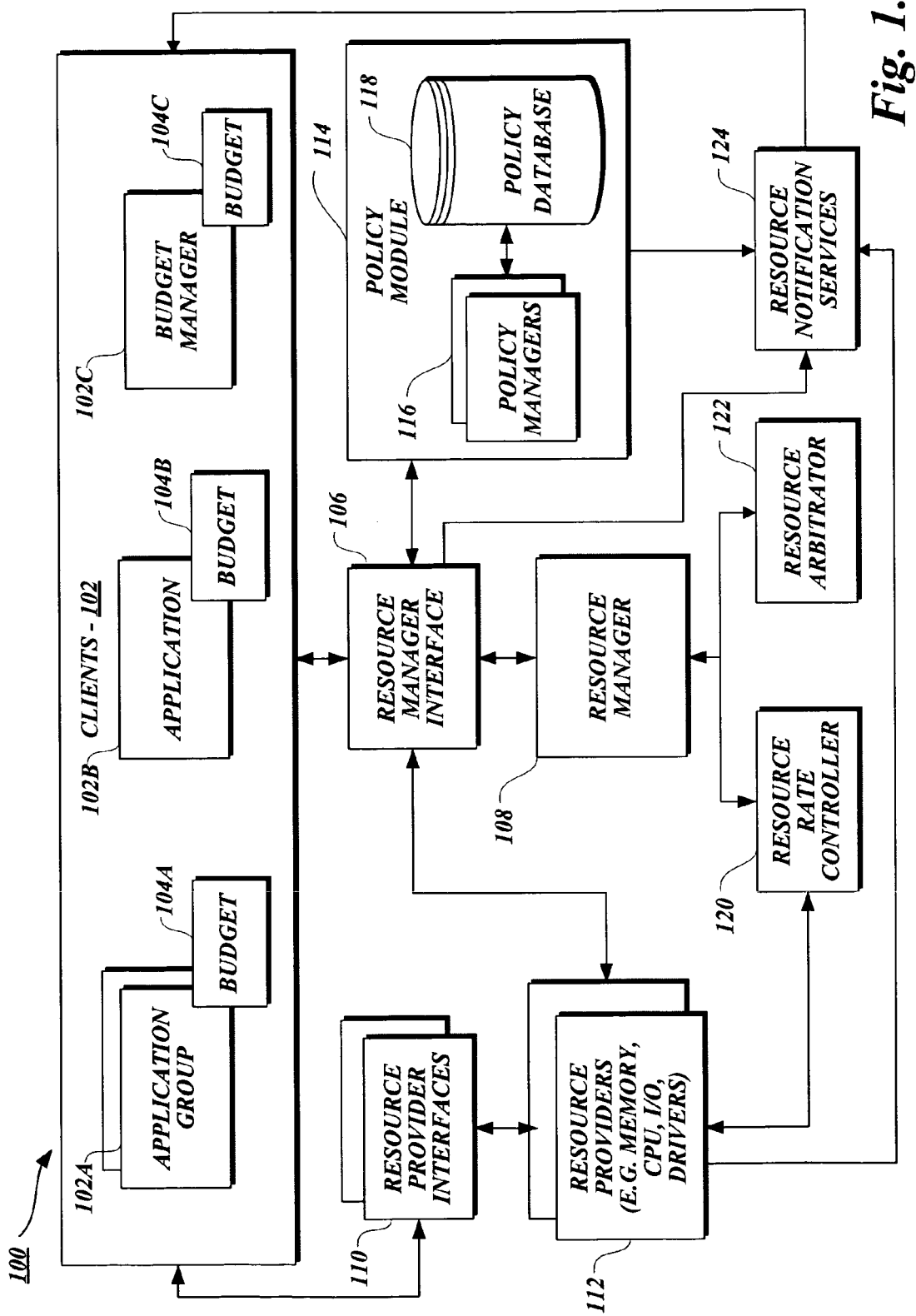
FIG. 1 is a depiction of an exemplary resource management system and one suitable operating environment in which resources may be managed in accordance with the present invention.

To successfully run an application on a computing device, the device's operating system must provide the application with various resources. A computing system suitable for implementing an improved method for managing those resources to facilitate their efficient allocation and use in accordance with embodiments of the present invention is described in detail in the following discussion.

In general, the resources that may be managed in an embodiment of the present invention include any quantifiable resource for which it is meaningful to allocate all or part for the use of an application or the operating system under circumstances where the resources may be temporarily or permanently depleted, or otherwise unavailable. Some examples of resources that may be managed are described in detail below. The resources are typically allocated amongst competing processes or threads operating on the device. The competing processes or threads may be executing on behalf of one or more applications or the operating system.

The most familiar resources that may be managed in an embodiment of the present invention are based on real and virtualized hardware: physical memory pages, disk blocks, peripheral devices, virtual address space, pagefile space, CPU time, object namespaces, etc. Some of these resources are implicitly allocated. For example, scheduling the CPU allocates CPU time, requesting an I/O operation consumes bandwidth throughout the I/O system, and accessing an invalid address generates a page fault.

In most systems, there are only a few fundamental (or base) resources of note; typical examples include disk (storage), I/O, CPU, kernel virtual address space (KVA), user virtual address space (UVA), and physical page frames. Most other resources are typically composited from these fundamental base types. Although KVA and UVA are abstractions built on top of physical memory, they represent a fundamental resource in that the amount of KVA and UVA space is limited by the number of logical address pins and operating system design, and not the amount of underlying physical memory.

Examples of resources that may be managed in an embodiment of the present invention implemented in the MICROSOFT WINDOWS NT operating system include, but are not limited to, non-paged and paged pool, system page table entries (PTE) for virtual pages partitioned off the KVA, pagefile space, paging rate, and AWE memory. Each of these resources, whether base or composite, may be defined by some set of characteristics that arise from artifacts and/or design decisions or requirements present in the operating system. A list of such characteristics is given below:

Limited (Absolute) Resources: In many cases, the availability of particular resources may be constrained by artificial limits imposed by the operating system. For example, due to a fixed number of slots in some table, the data structures used by the operating system may be limited. On the other hand, anything that can be counted (the total number of page faults, I/O bytes transferred, context switches, CPU time, etc.) maybe considered a resource when combined with an artificial limit. Most of the resources that fall under the "counted" category are typically implicitly allocated by the application that needs the resource. In a typical environment, the operating system may also limit simultaneous resource consumption, for example, by restricting the number of active network connections it may concurrently support.

Rate-based: The rate at which a resource can be allocated can also be a resource. For example, CPU time scheduled, I/O, page faults, and context switches can all be limited by the rate at which they can occur. Such limits may be either artificial (imposed by the operating system) or a practical limitation (e.g., a maximum sustainable possible I/O rate). Limited resources may be differentiated from rate-based resources in that limited resources are accounted for and limited based upon absolute quantities (e.g., total CPU time consumed, total page faults incurred, or total non-paged pool allocated). Rate-based resources may also differ from other types of resources in that a rate-based resource is typically automatically replenished in the absence of resource use over some duration of time.

Guarantees: In the case of most allocated resources, the operating system must arbitrate for resource availability instantaneously. Depending upon the state of resource use by other clients, the operating system may be unable to satisfactorily address a resource request for an extended period of time. For example, a low priority thread may remain starved until the system boosts its priority or, alternatively, all higher priority threads cease to be in a ready/runnable state. To alleviate this difficulty, particularly for clients that have bounded latency requirements that are necessary to support quality of service (QoS) levels, the system may offer guarantees regarding resource availability. Examples include promising to provide 100 milliseconds (ms) of CPU time every second, or to transfer 2 megabytes of I/O data per second, or to service up to 80 hard page faults per second. Such guarantees are meaningful only because the system will later act to realize them; thus, there is necessarily some restriction on the number of such promises the system may concurrently make. In this regard, guarantees may themselves be considered to be a resource.

The resources that may be managed in an embodiment of the present invention include both renewable and non-renewable resources. Resources can be categorized as renewable or non-renewable based on how they are replenished. Renewable resources are consumed when allocated to an application, but are automatically replenished with the passage of time. Most implicit rate-based resources, such as CPU rate, I/O bandwidth, and page fault rate, are renewable. Non-renewable resources are replenished when the application returns the allocation. Memory blocks, devices, counted limits, and data structure limits are all examples of non-renewable resources. Most resources are non-renewable.

The resources that may be managed in an embodiment of the present invention also include reclaimable resources. A reclaimable resource is one the system can retrieve from an application without the application's cooperation. The most severe form of retrieval is to simply terminate the application so that all of its resources are relinquished to the system. However, individual resources can be retrieved in many cases, with the effect on the application varying from degraded performance, to reduced functionality, and possibly to abnormal exit. Examples of reclamation include un-mapping a memory resource, de-scheduling an application, invalidating handles, and ceasing to honor guarantees. Certain resources, of course, cannot be reclaimed in the sense described here; typically such resources are infinite in quantity, but any portion allocated to a client is "consumed" and cannot be returned to the system. Examples include monotonically increasing quantities such as total CPU time consumed and total page faults incurred.

FIG. 1 illustrates an exemplary resource management system 100 and one suitable operating environment in which resources, such as those described above, may be managed in accordance with the present invention. As shown, a resource manager 108 operates in conjunction with resource providers 112 and clients 102 to manage the allocation of resources to the clients 102 by the resource providers 112 in accordance with a dynamic policy state. The resource providers 112 control the actual allocation of resources, whereas the resource manager 108 centralizes the management of the resources. In this manner, the architecture of the resource management system 100 decouples the allocation of resources from the functions of managing the resources.

In a typical embodiment, the resource manager 108 is implemented in a kernel mode component, but could be implemented elsewhere without departing from the principles of the present invention. The resource providers 112 are typically implemented as either user or kernel mode components. Examples include memory managers, and CPU reserve and IO categorization mechanisms. In one embodiment, a user mode resource provider 112 interacts with a kernel mode resource manager 108 using a kernel mode resource provider as a proxy.

As noted earlier, the resource manager 108 operates in conjunction with resource providers 112 and clients 102 to manage the allocation of resources to the clients 102 by the resource providers 108 in accordance with a dynamic policy state. The dynamic policy state is embodied, at least in part, in one or more budgets 104A, 104B, 104C formed in accordance with a policy module 114. In one embodiment, the policy module 114 may comprise one or more policy managers 116 and a policy database 118. In general, the policy module 114 operates to encode in the policy database 118 certain preferences such as the priority of specific clients 102 and other static (or relatively static) policy data. The budgets 104A, 104B, 104C, on the other hand, generally encode the dynamic resource requirements and restrictions of a particular client or set of clients. The use of the policy module 114 in the management of resources will be described in further detail with reference to FIG. 7.

The budgets 104A, 104B, 104C may be active or inactive. An active budget is one that is currently associated with a client 102. An inactive budget is one that has typically been created in advance for one or more clients to represent policy considerations, but for a number of reasons is not currently associated with a client 102. In a typical embodiment, a budget is implemented in a budget object. Budget objects are associated with one or more processes or threads currently executing on behalf of a client 102. Among other uses, the resource manager 108 uses the active budgets to determine how much of what resources the associated process or thread may use at a given point in time. In one embodiment, budgets may be dynamically created and/or activated and associated with any one or more of groups of related applications 102A, unrelated applications 102B, and budget managers 102C. The groups of related applications 102A, unrelated applications 102B, and budget managers 102C together comprise the clients 102 for whom resources are managed. The use of budgets to manage resources will be described in further detail with reference to FIGS. 2-4.

In one embodiment, the functions of the resource manager 108 include, among others, enforcing budgets 104A, 104B, 104C, including administering advance reservation requests for resources and bandwidth guarantees, monitoring available resources, and arbitrating resource contention. The functions of the resource manager 108 may further include adding and removing dynamic resources that may or may not be controlled by third-party resource providers.

In one embodiment, the functions of arbitrating resource contention among competing clients 102 may be embodied in a resource arbitrator module 122. In a typical embodiment, arbitration is performed at the request of a resource provider 112. In one embodiment, the resource arbitrator 122 determines whether resources should be reclaimed from an outstanding allocation to one client, i.e., a target client, to satisfy an outstanding request for the resource from another client, i.e., a requesting client. The resource arbitrator 122 makes such arbitration determinations in conjunction with the dynamic policy state, i.e., the current budget objects and other policy data, as will be described in further detail with reference to FIG. 6.

In one embodiment, the resource manager 108 is further provided with a resource manager interface 106 to facilitate communication with the clients 102, the resource providers 112, and other components of the resource management system 100. In particular, the resource manager interface 106 may be used to control interactions between the resource manager 108 and the budgets 104A, 104B, and 104C, as well as between the resource manager 108 and the components of the policy module 114. In one embodiment, the resource manager interface 106 may further control interactions between the resource manager 108 and resource notification services 124. The resource manager 108 may optionally use resource notification services 124 to notify interested clients 102 about resource availability and management. Upon receiving a notification, clients 102 may, in turn, cooperate with the resource manager 108 to release resources that are in short supply to facilitate efficient resource management. In some cases, client cooperation with notifications may help to avoid having to arbitrate resource contention later on.

In one embodiment, the resource manager 108 may further include a resource rate controller 120 to enforce rate control of resources on behalf of a resource provider 112, i.e. to control the consumption of a resource by one or more clients 102 per unit of time.

In a typical operating environment, the resource providers 112 may control interactions between the resource provider 112, the clients 102 and the resource manager 108 via one or more resource provider interfaces 110.

Figure 2:
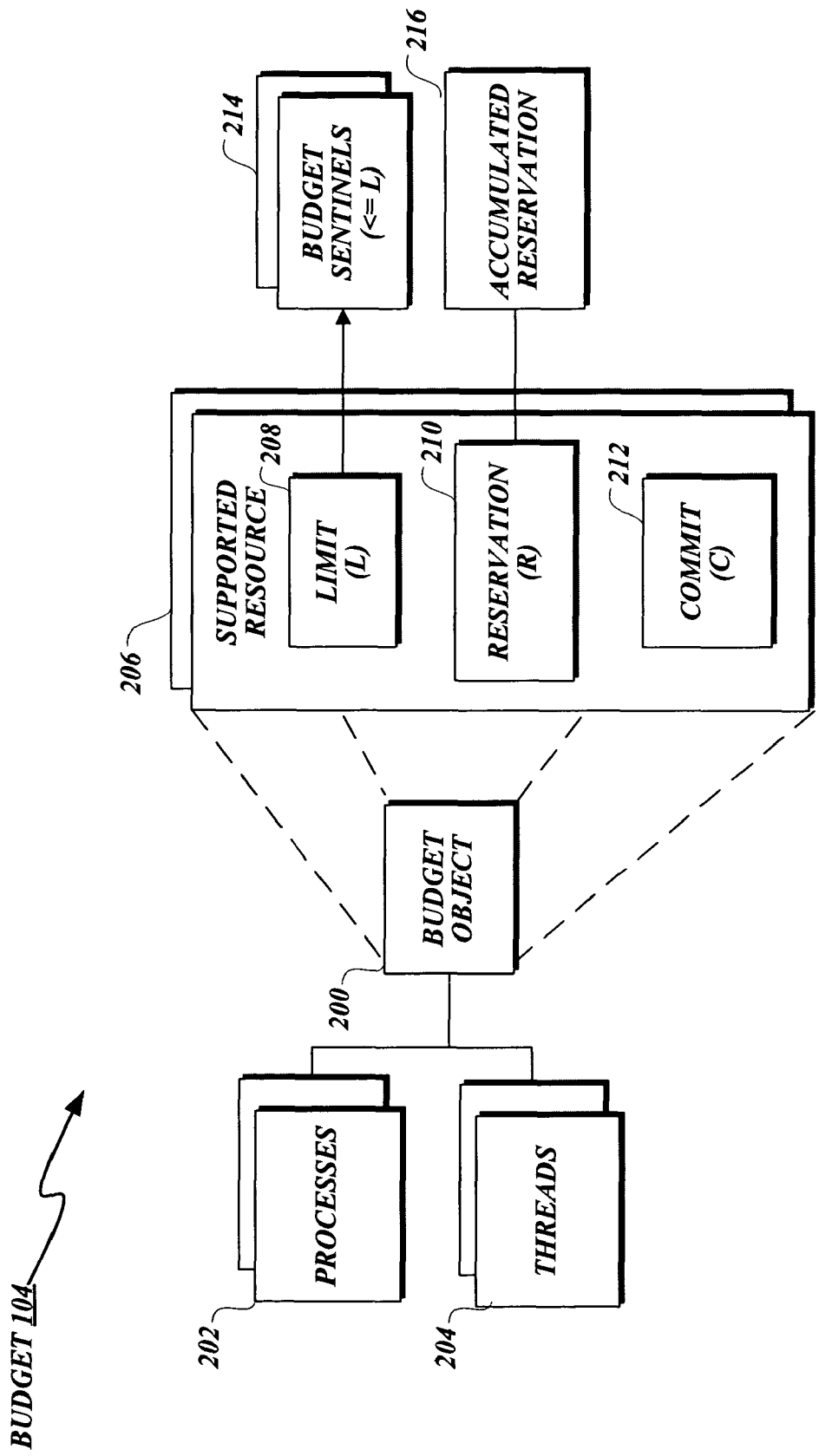
FIG. 2 is a block diagram depicting in further detail an arrangement of certain components of the budgets illustrated in FIG. 1 for implementing an embodiment of the present invention.

FIG. 2 is a block diagram depicting in further detail an arrangement of certain components of the budgets illustrated in FIG. 1 for implementing an embodiment of the present invention. A budget 104 may be implemented as a budget object 200 that is associated with one or more processes 202 and/or threads 204 executing on behalf of a client 102. The budget 104 encapsulates the resource requirements of the clients 102 with which it is associated in a manner that assists the resource manager 108 and resource providers 112 in providing quality of service (QoS) levels, resource reservation, and client isolation (throttling of resource use by a client).

Internally, budgets track three quantities for each supported resource 206: a limit (L) 208, a reservation (R) 210, and a commit value (C) 212. In the discussion that follows, the threads, processes, etc. associated with the budget 104 are referred to as clients of the budget, where client generally refers to the client 102 on whose behalf the thread or process is executing. For ease of description, references to threads 204 include processes 202 or any logic executing on behalf of a client 102 unless otherwise indicated. At any instant an executing thread's resource usage is subject to a single budget 104, i.e., the active budget object 200. At the same instant, the active budget object 200 may be associated with multiple threads executing on behalf of the same or different clients 102. The budget's parameters and the actual budget object 200 representing the budget 104 may vary over time, due to policy decisions implemented by the resource manager 108 or due to manipulation by the multiple threads 204 and/or processes 202 with which it is associated. Furthermore, budgets 104 may be hierarchically related in order to express relationships between different clients 102 on whose behalf threads 204 are executing such that the resource usage of one client may be tied to the resource usage of other clients associated with budgets in the same budget hierarchy.

The limit value (L) 208 represents a maximum amount of a resource that a budget may reserve for future use by the budget's clients. Though limits typically remain constant following budget creation, a system component with sufficient privilege may subsequently modify these limits. Limits may be of two types: hard or soft. A hard limit is an absolute limit on the amount of resources that may be assigned to a budget at the normal service level. If the limit is soft, then resource allocations in excess of the limit value L 208 are disbursed to the requesting client at a sufficiently degraded service level such that the system's ability to satisfy normal resource requests remains unimpaired. Such lower service level resource disbursements allow clients to make use of resources that might otherwise be underutilized The reservation value (R) 210 represents a maximum amount of a budgeted resource that a client of the budget can reserve, and is always bounded by the limit L 208, regardless of whether L is hard or soft. As such, the reservation value R 210 imposes a maximum on the amount of a resource that the clients of the budget will be able to subsequently allocate at the normal service level without requiring resource arbitration. Since reserved resources are effectively unavailable for reservation by other clients all reservations are typically conservative so as to minimize resource under-utilization and unnecessary resource contention.

The commit value (C) 212 records the actual amount of resource that a resource provider 112 has allocated to a client 102 of the budget. Because a limit L 208 that is soft marks the threshold at which resource allocations cease to be provided at the normal service level, the commit value C 212 may be written as the sum of two values: normal commit (Cn) and excess commit (Ce). All allocations up to the limit L are considered to be of the Cn type, which indicates that the resource provider allocated Cn resource to clients at the normal service level. Ce represents the fraction of commit that is granted to applications at a degraded service level, and is only granted to an application if both L is soft and Cn=L, i.e. when the resource provider has already allocated the full amount of the soft limit. Thus when L is a hard limit then Ce is necessarily zero.

The limit L 208 itself serves as a loose upper bound on the amount of a resource that may be reserved, R 210. R 210 is constrained by the other reservations present in the client's budget hierarchy, as will be described below with reference to FIG. 3, and reservations elsewhere in the system. Since resource allocations classified as excess commit Ce are reclaimable, clients 102 typically use excess resource allocations to perform optional or non-time critical processing (e.g., to provide additional MP3 video display effects, etc.).

The aim of soft limits is to ensure that resources in the system are not underutilized, particularly in the absence of contention. For resources that are idle, for example, it is generally safe for a resource provider 112 to classify the resource as excess and allow it to be allocated to needy clients. For resources that can be explicitly reserved in advance of being committed, i.e., finite resources as opposed to rate-based resources, a resource provider 112 may speculate as to which portions of a reserved but uncommitted resource are unlikely to be used in the near future. The resource provider 112 may then disburse such resources to a requesting client 102, but must be sure that the resource can be reclaimed quickly, efficiently, and likely without the explicit cooperation of the client 102. Otherwise, the resource provider 112 may subject clients 102 that have made advance reservations to unreasonable delay while the necessary resources are reclaimed. Thus, there are only a handful of resources for which the concept of soft limits is both meaningful and practical for the resource manager 108 to implement.

In an example implementation of a soft limit, suppose that at time a the value of C was Ca and at time b was Cb such that a<b, a single allocation of C'=Cb−Ca was made, and Ca<R<Cb. In this case a portion of Cn, (R−Ca), can always be guaranteed to be made without the need for resource arbitration. This requirement does not preclude the resource provider from reclaiming the resource quantity (R−Ca) from a Ce allocation granted to another client and using it to satisfy this request as long as the resource provider can perform such an action within a span of time that is approximately equivalent to the time required to allocate resource from the available (unused) resource pool. Note that if the resource cannot be allocated in a fragmented manner (as with e.g., physical pages), then arbitration may be required for the entire allocation C' rather than just (Cb−R).

A typical use of soft limits is to avoid under-utilization of CPU. When a budget 104 has a limit L 208 of a certain percentage of CPU consumption, and there is no contention for CPU, then there is generally no reason that the clients of the restricting budget cannot consume all of the CPU (as otherwise, the CPU would go completely unused). The difficulty in simply disbursing the available CPU to the clients in question is that it must be easily revoked should any other clients (not bound to the restricting budget) become ready. If the CPU could not easily be reclaimed and disbursed to a legitimate client, the usefulness of the soft limit L 208 set in the restricting budget would be thwarted. While achieving zero reclamation cost is difficult to achieve, it can be greatly minimized in certain cases. In the case of CPU, for example, once the limit L 208 has been exceeded, the priority of the restricted threads can be dramatically lowered before allowing them to continue execution. Thus, in the absence of CPU contention, the restricted threads are scheduled on the CPU and their operation continues unhindered. Should any other unrestricted thread (not associated with the budget) become ready, or should contention for CPU otherwise occur, the lowered priority ensures that the restricted threads do not interfere with the legitimate activity of the unrestricted threads. When the resource is replenished, the restricted threads' priorities are restored to their former levels.

Typically, a resource provider will determine whether to provide excess resource allocations, i.e., whether to impose soft limits as opposed to hard limits, based upon the amount of time in which reclamation can be achieved. In this manner, the reclamation time may be used to bound the wait time that a legitimate normal resource allocation Cn may encounter, assuming the resource is held in Ce allocations in other budgets. Note in general as described above that the reclamation time can be bounded only for portions of a Cn allocation that are less than R; other portions of R can at worst be delayed by the time required to reclaim the resource from the Cn allocations given to other clients.

By allowing soft limits, a client 102 of a budget 104 may partially compensate for an artificial limitation set on its reservation requests due to unused reservations made by other clients in the system. It should be noted that soft limits may appear to negate the effectiveness of budgets 104 in constraining resource usage, as they permit committed usage to be unbounded. However, allocations beyond the soft limit are typically limited to resources that would otherwise be underutilized. Not all resource providers 112 may support soft limits. For example, the use of soft limits to avoid underutilization may not be desirable when the goal is to provide consistent performance (as opposed to optimal performance). Thus, not all supported resources 206 in a budget 104 may be subject to a soft limit L 208.

Soft limits provide a means by which resource under-utilization may be combated, but do not offer a means by which interested parties may receive advance notice that the resource usage tracked by a particular budget has passed a certain threshold. To address this omission, resource budgets 104 support the notion of "sentinels," or alarms, on resource usage by optionally including a budget sentinel value 214. The only restriction on the value of budget sentinels 214 is that they are less than or equal to the current resource limit L 208 set in the budget 104 (if the resource limit L is contracted to a value less than the sentinel's value, then the sentinel is invalidated). The sentinel's value bears no ordering relation to the current normal commit (Cn) or reserve values R for the resource in question. When the current normal commit Cn value of a particular resource exceeds the sentinel value 214, other clients 102 may be notified, for example, by using the notification services 124 described in detail with reference to FIG. 5 below. Upon receipt of such a notification, the client 102 may react as it sees fit (e.g., by adjusting resource usage, modifying resource limits, etc.). In a typical embodiment, to avoid severe performance degradation in cases of hysteresis (in which the current normal commit Cn value oscillates back and forth across the value of the budget sentinel 214), sentinel notifications are one-time events: once the notification has been issued, the sentinel remains inactive until an interested listener, e.g., a client 102 or system administrator, explicitly reactivates it.

A budget 104 may be part of a budget hierarchy, as will be described in detail with reference to FIGS. 3A-3B below. For simplicity in the following discussion the limit is assumed to hard such that Ce=0 and thus C=Cn. For a generalized discussion Cn may be substituted for C below. When part of a hierarchy, in addition to the L 208, R 210, C 212, and budget sentinel 214 values described above, each budget 104 may include accumulated reservation 216 value, in which the accumulated amount of resource reservation R 210 of all hierarchically related budgets below the level of the current budget 104 is maintained, also referred to as the sub-tree reservation. The accumulated reservation 216 value facilitates the enforcement of budget restrictions for budgets that are part of a budget hierarchy as will be described in detail with reference to FIGS. 3A-3B below.

Figure 3A:
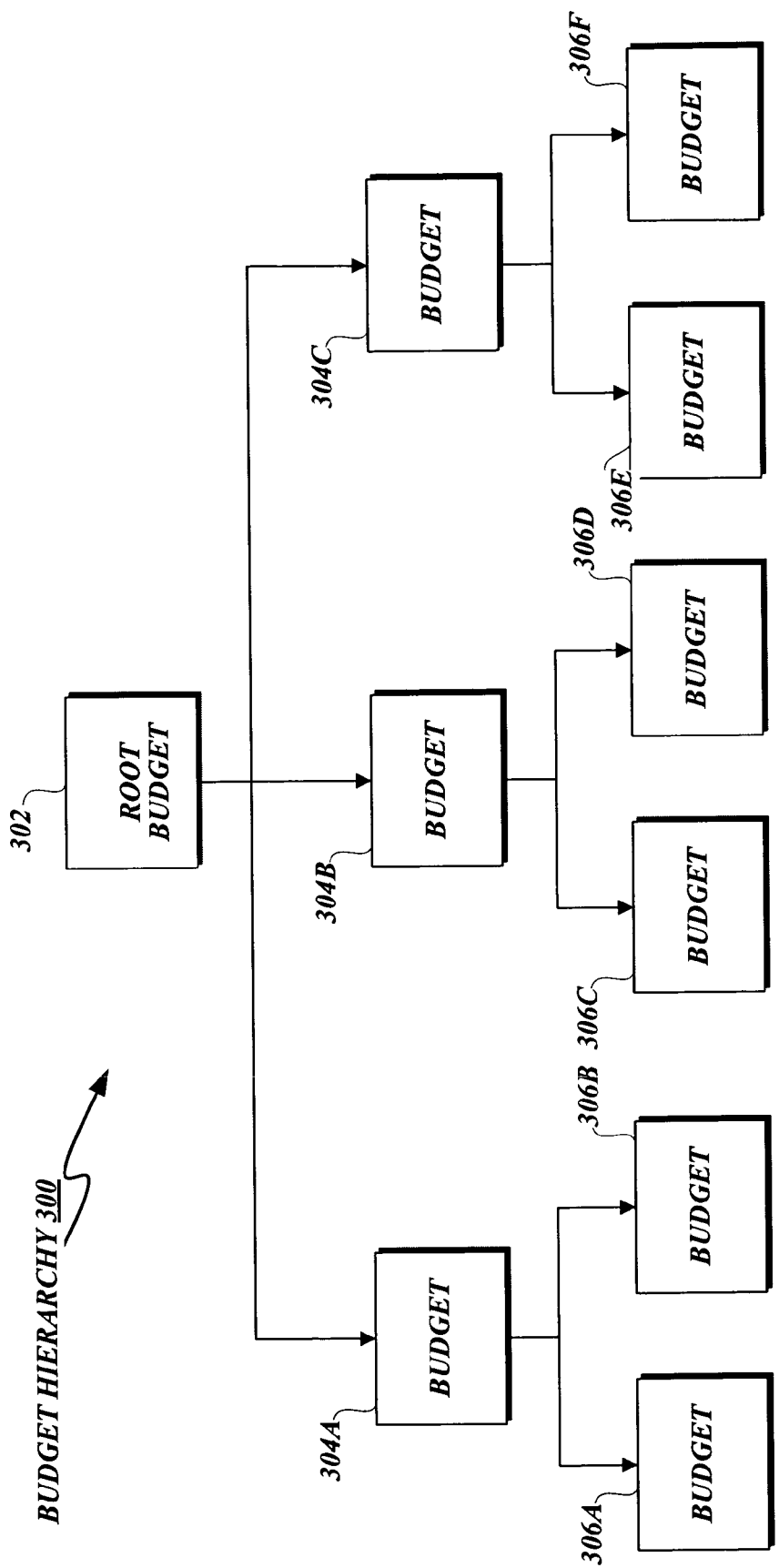
FIGS. 3A-3B are pictorial diagrams of exemplary budget hierarchies formed in accordance with an embodiment of the present invention.
Figure 3B:
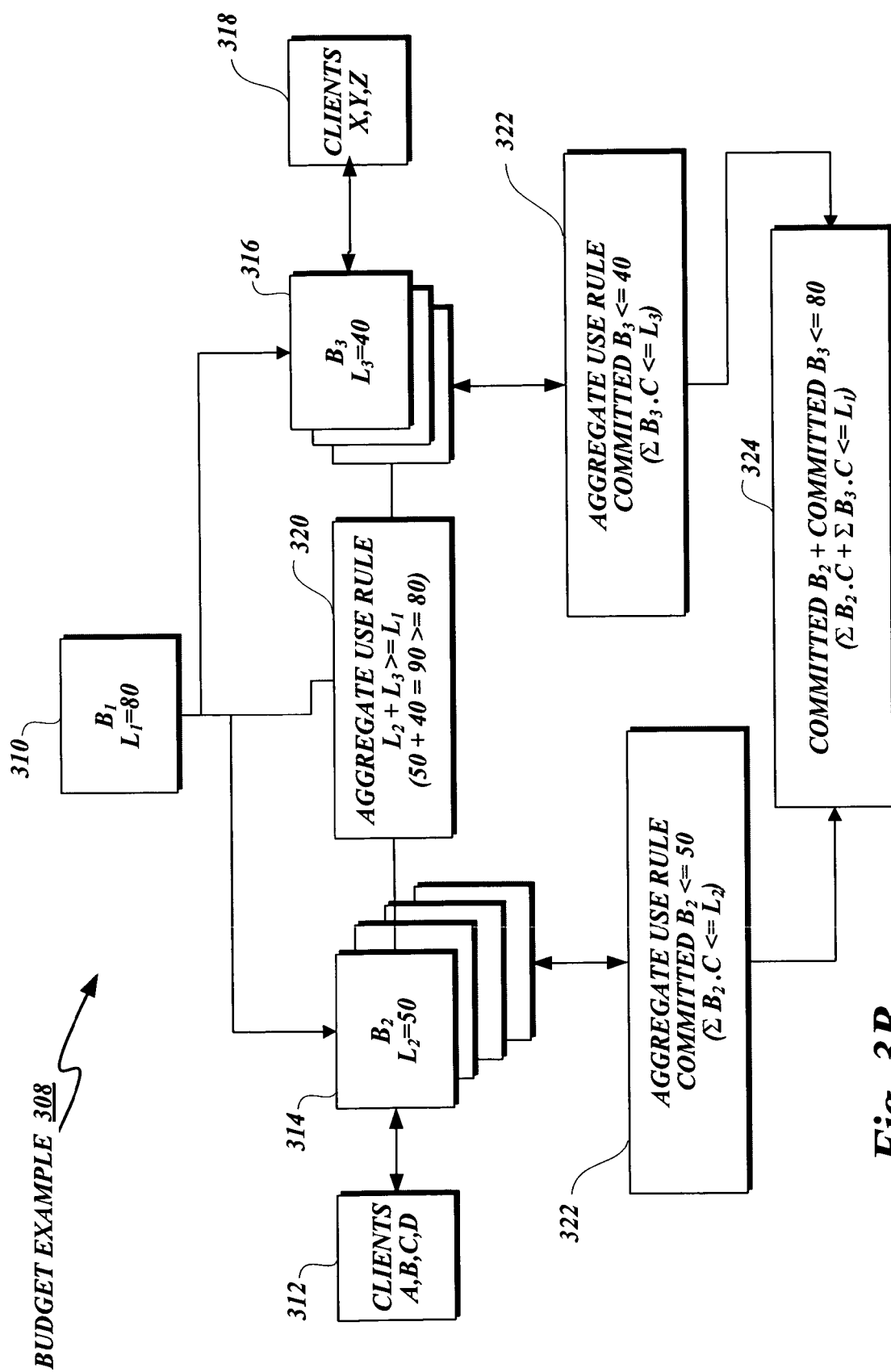

FIGS. 3A-3B are pictorial diagrams of exemplary budget hierarchies formed in accordance with an embodiment of the present invention. Among other uses, budget hierarchies provide a mechanism to express rules concerning the resource requirements and restrictions of the budgets belonging to the hierarchy. As illustrated in FIG. 3A, a exemplary budget hierarchy 300 links together in an n-ary tree formation the resource requirements and restrictions, i.e., the limits L 208, reservations R 210, and commitments C 212, expressed in budgets 302, 304A-C and 306A-E, that form the budget hierarchy 300.

A budget hierarchy 300 typically comprises a root budget 302 and one or more child budgets 304A, 304B, and 304C. The child budgets may, in turn, comprise additional child budgets 306A, 306B, 306C, 306D, 306E, and 306F. The resource manager 108 uses the root-level budget 302 to impose the final barrier to admitting or denying a resource reservation request initiated by the client 102 of one of the budgets in the budget hierarchy 300. Any such reservation request must satisfy the budget constraints present at each level of the hierarchy 300 between the initiator's budget and the root. Thus, a request initiated by a client of budget 306F must satisfy not only the constraints of budget 306F, but also of budget 304C, and root budget 302.

In one embodiment, once a resource request is admitted by the resource manager 108 in accordance with the budgets in budget hierarchy 300, requests are generally further reviewed by the appropriate resource provider 112 to ascertain whether it is practicable to admit the reservation request in light of outstanding reservations and allocations. Note that a request that is practicable to admit may be preemptively denied by the resource manager 108 under the constraints specified by the budgets in the budget hierarchy 300.

In a typical embodiment, to improve the performance of traversing up the budget hierarchy 300, the resource manager 108 may cache the total accumulated amount of reservation made in a sub-tree of the budget hierarchy 300 at the sub-tree's root budget. In this manner, a resource reservation request initiated by a client of a non-root budget (also referred to herein as a derived budget) need only be checked against the requestor's budget and all the budgets above it in the hierarchy. In the illustrated example, a request initiated by a client of child budget 306F is checked against the requestor's budget, i.e., the child budget 306F itself, and all of the budgets above it in the budget hierarchy 300 in the direct path to the root budget 302, and not sub-tree budgets 304A, 304B, or budgets at the same level, child budgets 306A-E.

Note that a derived budget need not necessarily have a limit (L) 208 that is less than the limit specified in any of its ancestors. This is because external policy may link a pre-defined budget 104 into a budget hierarchy 300 in response to the launch of an application of a client 102. In cases in which the local limit, i.e., the child budget's limit, is greater than the limit in an ancestor, the correct result will still be achieved as the request will be blocked higher up the tree.

In a typical embodiment, a root budget 302 is not an absolute partition of the system's resources, unless the summation of the L values 208 across all root level budgets 302 exactly equals the total available resources in the system. Since limits L 208 can be adjusted post-budget creation and result in an over-subscription of resources, resource partitioning is instead typically accomplished by requesting a reservation of resource guarantees (e.g., CPU bandwidth guarantees).

As noted earlier, budget hierarchies 300 provide a mechanism to express rules concerning the resource requirements and restrictions of the budgets belonging to the hierarchy. An example 308 of a budget hierarchy and the rules that are expressed in the hierarchy is illustrated in FIG. 3B. In the example 308, a system administrator wishes to constrain the aggregate use of CPU by the clients {A, B, C, D} 312 and clients {X, Y, Z} 318 to no more than 80 percent of the available CPU in the system. However, clients {A, B, C, D} may use up to 50 percent of the CPU, as shown in aggregate use rule 322, while clients {X, Y, Z} are restricted to just 40 percent, as shown in aggregate use rule 324. Expressing this type of rule using a single standalone budget proves difficult, particularly since the individual limits of 50 and 40 percent add up to more than the desired effective limit of 80 percent, as set forth in aggregate use rule 320 ($L_2+L_3>=L_1$, e.g., 50+40=90>=80). However, a system administrator can achieve the desired result by creating the illustrated budget hierarchy 308 formed in accordance with an embodiment of the present invention.

As shown, the illustrated budget hierarchy example 308 is comprised of budgets $B_2$ 314 (with limit $L_2$ of 50 percent) and $B_3$ 316 (with limit $L_3$ of 40 percent), each of which is derived from a root budget $B_1$ 310 (with limit $L_1$ of 80 percent). Clients {A, B, C, D} 312 are associated with budget $B_2$ 314 and clients {X, Y, Z} 318 are associated with budget $B_3$ 316. The resource manager 108 enforces the limits in the example budget hierarchy 308 by restricting the respective amounts of committed resources to the limits $L_2$ and $L_3$ in budget $B_2$ 314 and budget $B_3$ 316, as illustrated in aggregate use rules 322 (committed $B_2<=50$, $\Sigma B_2 \cdot C<=L_2$) and 324 (committed $B_3<=50$, $\Sigma B_3 \cdot C<=L_3$). The resource manager 108 further enforces the limits in the example budget hierarchy 308 by restricting the combined amount of committed resources to the effective limit $L_1$ expressed in budget $B_1$ 310, as illustrated in aggregate use rule 326 ($\Sigma B_2 \cdot C + \Sigma B_3 \cdot C <= L_1$).

As shown in the illustrated example budget hierarchy 308, budget hierarchies 300 in general provide a means of apportioning resource limits L 208 to clients 102 in order to encapsulate their respective resource use, while imposing an effective limit equal to the most restrictive of the limits specified in a client's local budget, i.e., the child or derived budget, and the limits encoded in the budgets along the path to the corresponding root budget.

In general, the following invariants hold regarding any budget hierarchy 300. A limit L 208 for any budget may be hard or soft. In addition, the limit L 208 is typically greater than or equal to the reservation R 210 and is also greater than or equal to the normal commit Cn 212. If the value of the limit L 208 is soft, then the excess commit Ce may be greater than or equal to zero, and is generally bounded by the amount of idle resource available in the system. If the limit L 208 is a hard limit, then no excess commit value is usually permitted, i.e., the Ce is usually zero—a requirement that is typically enforced by the resource manager 108. The amount of reservation R 210 for any budget 104 is restricted not only by the budget's limit value L 208 but also by the reservations and limits set elsewhere in the budget hierarchy 300. As such, the limit L 208 typically serves only as a loose upper bound on the amount of reservation R 210 that may be made. Lastly, the normal commit value Cn can always reach the value of R, even if this requires the resource manager 108, in cooperation with the resource provider 112, to reclaim any excess committed resource Ce that may have been reserved or allocated to other clients 102. Any portion of the normal commit value Cn that is less than R 210 also obtains a performance benefit in that a hierarchy traversal for limit considerations is avoided because the value of R in the budget has been previously validated against the limits in the hierarchy. Again, the maximum value that the normal commit value Cn may have is bounded by L 208, but due to hierarchy restrictions and over subscription of resources it may never reach this value.

Figure 4:
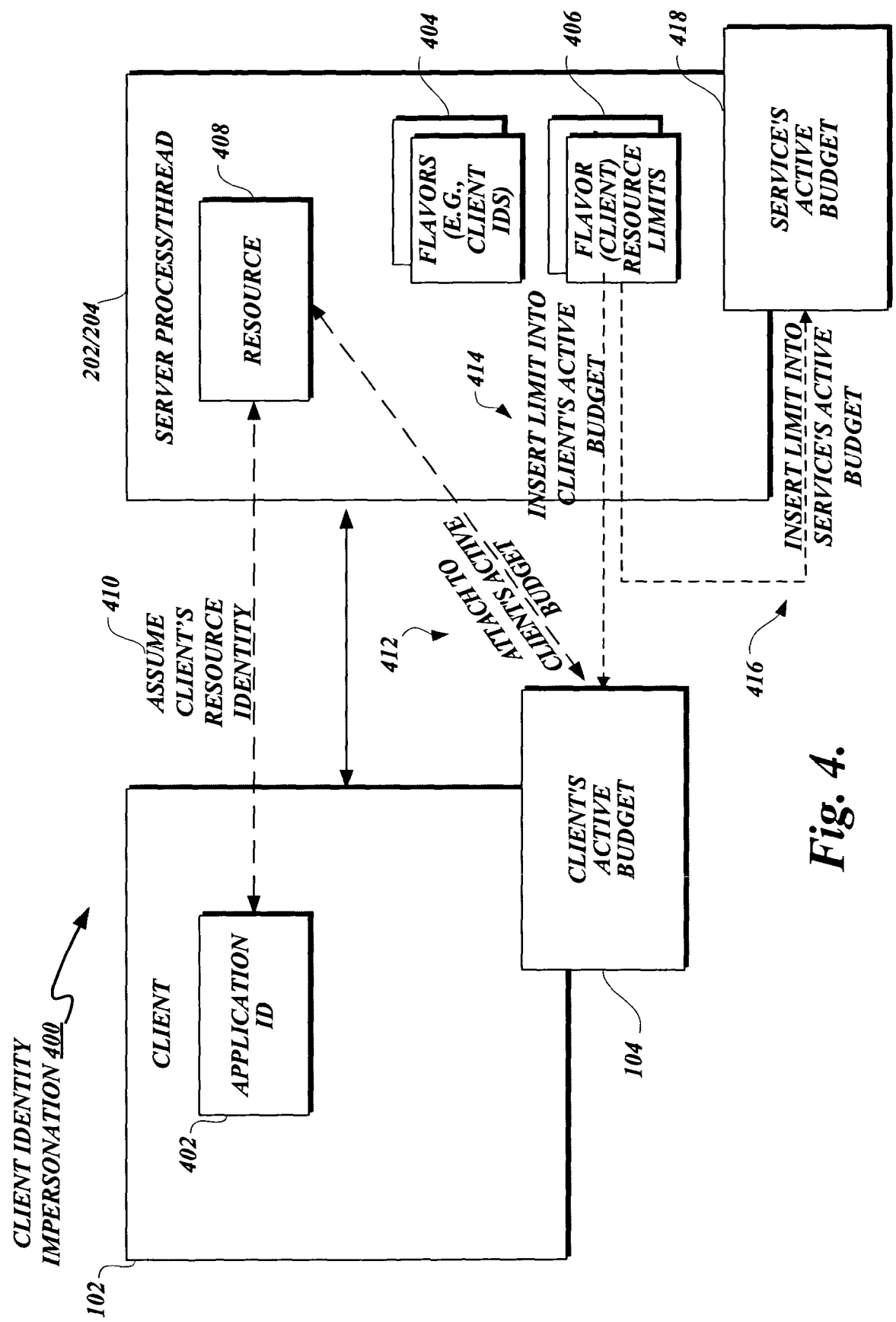
FIG. 4 is a block diagram depicting in further detail an arrangement of certain components of the budgets illustrated in FIG. 1 for implementing an embodiment of the present invention.

FIG. 4 is a block diagram depicting in further detail an arrangement of certain components of the budgets illustrated in FIG. 1 for implementing an embodiment of the present invention. As noted previously, the active budget 104 for a particular process 202 or thread 204 may change numerous times over the course of its lifetime, depending, at least in part, on the client 102 on whose behalf the process or thread is executing. In some cases it may be beneficial to temporarily associate with a particular budget for resource accounting purposes. For example, in the case of a service process that is performing a service for one or more clients on a set of concurrently executing threads, it may be desirable to enforce budget restrictions and record consumption based on the particular client on whose behalf the process or thread is currently executing. Examples include drivers and services, which often perform work (and consume resources) on behalf of a client.

In a typical embodiment of the resource management system 100, such budget enforcement and consumption recording may be achieved through the use of client resource-identity impersonation 400, a generalized overview of which is illustrated in FIG. 4. Client resource-identity impersonation 400 temporarily associates a process or thread 202, 204 with a client 102 by allowing the process or thread to assume the client's resource-identity 410 in order to locate and temporarily attach 412 to the client's active budget 104. The resource manager 108 is then able to properly enforce the active budget's restrictions and record consumption for the resource 408 that the process or thread 202, 204 is using on behalf of the client 102. In a typical embodiment, the client's resource-identity 410 may be derived from the application ID 402, or other identifying information that the system maintains for the client 102, such as the current token.

In a typical embodiment, client resource-identity impersonation 400 is appropriate when a service, i.e., the process or thread 202, 204 operating on behalf of the service, both allocates and relinquishes a resource while temporarily attached to the client's active budget 104. If the service allocates a resource that persists beyond the impersonation period, such as objects (handles) or memory for local caches, this should not be charged to the client, since those resources are typically maintained by the service in order to facilitate other future requests for different clients. Thus, in a typical embodiment, upon receipt of a client request, the service first determines whether resource client impersonation is appropriate given the nature and lifetime of the resources required to accomplish the client's task. Even if the service ascertains that impersonation is the appropriate course of action, the service must have sufficient privilege to locate and attach itself to the client's budget 104. If the service has insufficient privilege to accomplish resource client impersonation, or determines that such impersonation is inappropriate, the service may take alternate action to limit resource usage as described below.

Since a process or thread, 204, 202, operating on behalf of a service may offer services to any number of clients, but may allocate persistent resources in response to particular client requests (such as handles), the process (or thread) may desire to impose some type of limitation on this usage in a per-client manner. The service process or thread, 204, 202, can thus take one of two approaches to limiting its own resource consumption in a per-client manner: either limiting the rate at which a given client 102 can invoke the service, or partitioning its own budget to reflect its clientele.

In the first case, the service can control the rate at which a particular client forces the service to deplete its own resources by using the rate controller 120 function provided by the resource manager 108 to limit the rate at which the client may invoke the service. This can mitigate the effect that a particular client's requests may have on the service's ability to address the needs of all the clients in the system. To avoid the overhead of apportioning every client budget with a rate limit for every service, by default no such limits are typically present in any budget 104. Rather, a service interested in imposing such a limitation may dynamically insert the limit 414 into the client's budget 104, an operation which typically requires appropriate access rights. For example, a resource provider 112 may automatically attempt dynamic limit insertion based upon a failure code returned when attempting to charge for a particular resource. The resource manager 108 may then enforce the limit using the resource rate controller 120 when enforcing the client's active budget 104. Since any client 102 associated with a budget 104 may cause additional per-service limits to be inserted in the budget, the resource manager 108 may periodically purge the least recently used budget entries during rate replenishment.

In the second case, the service assigns a flavor 404 to each client of interest and dynamically inserts 416 the desired resource limits 406 associated with this flavor into its own active budget 418. This allows the service to ration its own resource usage in a per-client manner. Note in this case the burden of tracking which flavor corresponds to which client falls upon the service and not the resource manager 108, whereas in the first case, once the limit is inserted into the client budget 104, the resource manager 108 will automatically enforce adherence to it.

Note that the use of flavors illustrated in the second case may also be applied in a similar manner to clients 102 that want to manage their own use of resources based on type of use. In that case, the client maintains its own flavors 404 and corresponding flavor resource limits 406, and dynamically inserts those limits into their active budget 104 depending on how they are currently using a particular resource.

Drivers may limit resources in a manner similar to services. In general however, correct impersonation becomes difficult as the driver may not necessarily execute code in response to a client request but rather in response to an external event. As such, the driver may not be in the appropriate context when it performs resource allocations. If a driver wishes to take the impersonation approach, it may maintain references to the appropriate budgets itself and manage their use appropriately. Again, such an approach leaves client budgets susceptible to driver resource leaks and/or errant resource use. Moreover, issues of fairness arise when considering persistent kernel state allocated by drivers but charged to client budgets. In a typical embodiment, drivers may avoid such problems by partitioning their own budgets using per-client flavors 404, and flavor resource limits 406, as described above, and allocate resources accordingly. However because drivers do not execute in the context of a single client, the active flavor can be specified explicitly to the resource allocation APIs as a parameter or by passing a reference to the actual budget, or implicitly associated with the current client (or current processor) for the duration of the drivers' execution.

Figure 5:
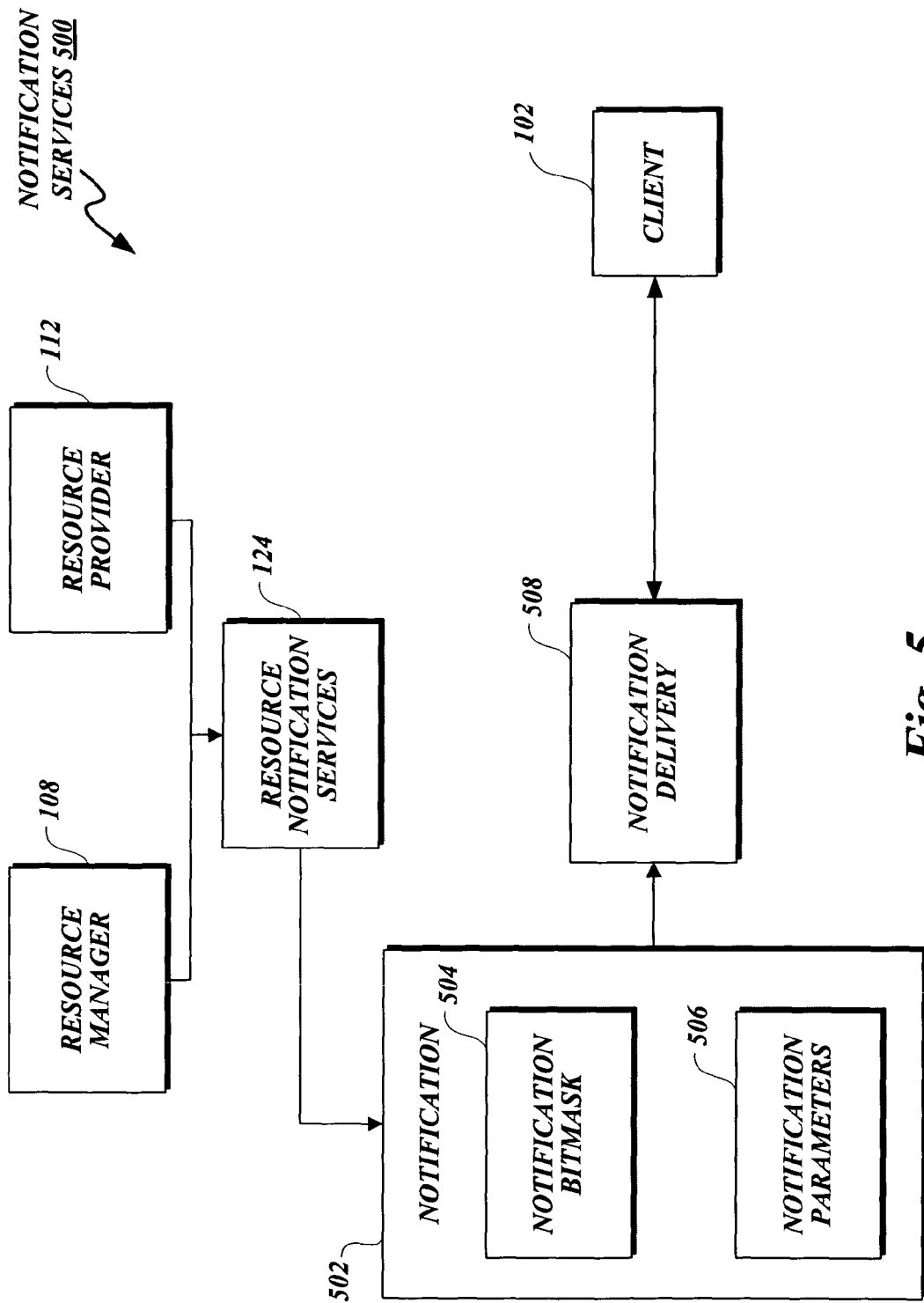
FIG. 5 is a block diagram depicting in further detail an arrangement of certain components of the resource notification services illustrated in FIG. 1 for implementing an embodiment of the present invention.

FIG. 5 is a block diagram depicting in further detail an arrangement of certain components of the resource notification services 124 illustrated in FIG. 1 for implementing an embodiment of the present invention. Resource management works best with cooperation from the clients 102 for which the resources are being managed. Accordingly, a typical embodiment of a resource management system includes a notification services component 500. In the illustrated embodiment, notification services 500 entails the delivery 508 to clients 102 of resource notifications 502 to enable the resource management system 100 to solicit the cooperation of those clients to achieve reduced resource consumption or temporary suspension, or to apprise clients 102 of changes in resource availability that may affect them, or otherwise be of interest to them. The purpose of notifications 502 is to give clients 102 an opportunity to cooperate with the resource manager 108, but the system 100 must continue to function as best it can even if clients are errant.

Notification services 500 provide a reliable and lightweight event notification mechanism to interested clients 102. Clients 102 may choose the desired delivery method, the delivery methods having various levels of delivery assurance. In a typical embodiment, the notifications 502 consist of a bitmask 504 representing a set of events that have occurred. In addition, auxiliary notification parameters 506 associated with a notification 502 may be optionally communicated between a client 102 and a notification provider, e.g., the resource manager 108 or a resource provider 112, typically by using an out of band application programming interface (API).

In one embodiment, the notification services 500 utilizes a pull system to manage event delivery, giving clients 102 the freedom to decide when, if ever, to retrieve the full notification bitmask 504. The first occurrence of an event in a client's interest set (some client-specified subset of the notification provider's supported bitmask) triggers the delivery technique specified by the client, whereas subsequent events, either of the same type or not, are batched into the stored bitmask. As such, repeat occurrences of a particular event are lost until the client opts to retrieve the bitmask 504, at which point the batched bitmask is reset (i.e., cleared). Depending on the chosen delivery method, this approach gives clients 102 the freedom to process notifications 502 at their own volition. Example uses of the resource notification services 124 will be described with reference to resource arbitration in FIG. 6 below.

Figure 6:
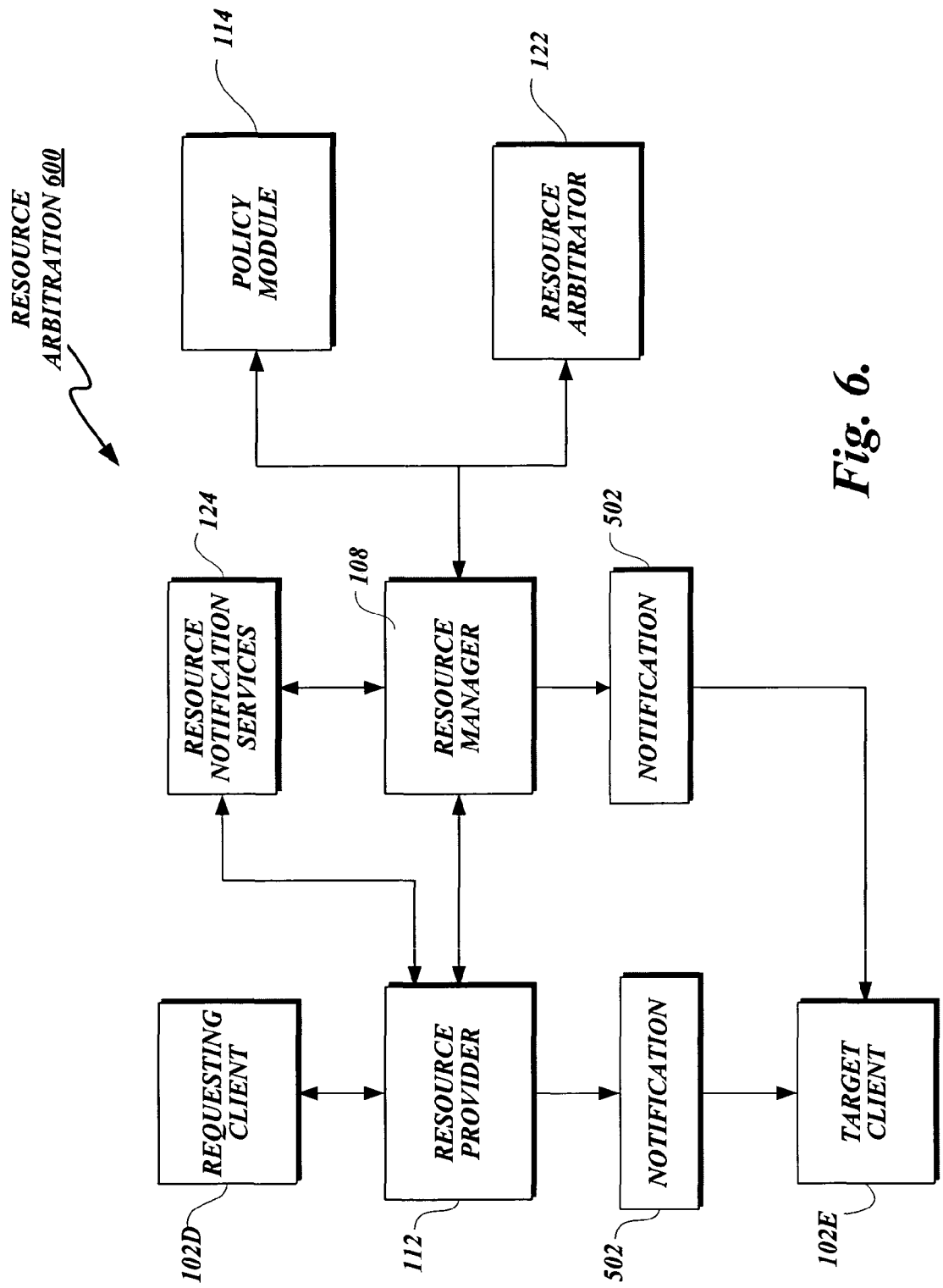
FIG. 6 is a block diagram depicting in further detail an arrangement of certain components of the resource arbitrator illustrated in FIG. 1 for implementing an embodiment of the present invention.

FIG. 6 is a block diagram depicting in further detail an arrangement of certain components of the resource management system 100, as illustrated in FIG. 1, for performing resource arbitration 600 in accordance with an embodiment of the present invention. In operation, a resource provider 112 receives a resource allocation request from a requesting client 102D. If the resource provider 112 is unable to satisfy the resource allocation because insufficient resources are available, and not because the requesting client 102D simply exceeded a budget resource limitation, the resource provider may request the resource manager 108 to perform resource arbitration using the facilities of a resource arbitrator 122.

In a typical embodiment, the resource provider 112 provides the resource manager 108 with the information necessary to determine whether resources should be reclaimed from some outstanding allocation in order to satisfy the requesting client's request. The resource manager 108 in turn makes this determination in conjunction with the dynamic policy state embodied in the policy module 114. As described with reference to FIG. 1, the policy module 114, comprises, among other components, a policy database 118 of client priorities and user preferences that is populated by a higher level entity, such as a policy manager 116 or a budget manager 102C. The details of the policy module 114 will be further described with reference to FIG. 7.

As an example, the policy database 118 may indicate that the user has assigned the highest preference to the requesting client 102. The dynamic policy state may also indicate a potential reclamation target client 102E, as well as a set of allowed actions that may be taken against the target in order to reclaim the resource. Depending on the current policy reflected in the dynamic policy state, the resource manager 108 may respond to the calling resource provider's 112 arbitration request by instructing the provider to satisfy the requesting client's allocation request by using any means necessary, including reclaiming resources that may have been allocated to one or more target clients 102E in accordance with an action specified in the allowed action set for that target.

In attempting to reclaim resources for use by the requesting client 102D, the resource provider 112 selects a potential target client 102E from which resources can be reclaimed. If the resource manager 108 does not suggest a target for the reclamation (as indicated in the dynamic policy state), the resource provider 112 may choose a client of its resources as it deems appropriate. Once the resource provider 112 chooses a target, the resource manager may issue a resource notification 502 using the resource notification services 124 in an effort to solicit cooperation from one or more targets to release the resource in question. Alternatively, or in addition, the resource provider 112 may proceed to reclaim the resource by issuing its own resource notification 502 (again, using the resource notification services 124) and/or using one or more actions selected from a set of actions as indicated in the dynamic policy state. The set of actions may range anywhere from passive (contacting the target client 102E and requesting that it voluntarily cede an amount of the resource, e.g., issuing the notification 502), to proactive (forcibly reclaiming the resource), to aggressive (terminating the target). In one embodiment, well-written clients can cooperate seamlessly with passive actions by obeying the various notifications issued by the resource manager 108 and various resource providers 112 concerning resource state changes. Example notifications 502 might include "release units of resource X" or possibly "freeze state for later resumption."

When the client 102 does not cooperate with the notification 502, such as by ignoring issued notifications, or, alternatively, when the target client 102E is a legacy application that predates resource management, or has chosen not to participate in resource management, or is otherwise unresponsive, then the resource provider 112 may escalate its attempts to free resources using either the proactive or aggressive actions.

As noted earlier, a reclaimable resource is one than can be safely retrieved from an application without the application's cooperation. Resources can always be reclaimed transparently from an application, but the potential effect on the target client 102E may vary from degraded performance, to reduced functionality, to abnormal termination. Reclamation is preferable to a more aggressive action (e.g., terminating the application) only insofar as the effect on the target's behavior is predictable and will not lead to an unexpected termination. For instance, reclamation methods can include ceasing to honor bandwidth guarantees, de-scheduling an application, invalidating handles, and un-mapping a memory resource. In this instance, reclamation is considered reasonable only in the first two cases, as it may have a non-deterministic effect in the latter two cases.

It should be noted that resources that cannot be reclaimed as earlier described, such as total CPU time consumed and total page faults incurred, are not generally subject to resource arbitration. This is because allocation failures of resources that cannot be reclaimed typically arise only due to artificial budgeted limits L 208 enforced by the resource manager 108, in which case resource arbitration is unnecessary.

Figure 7:
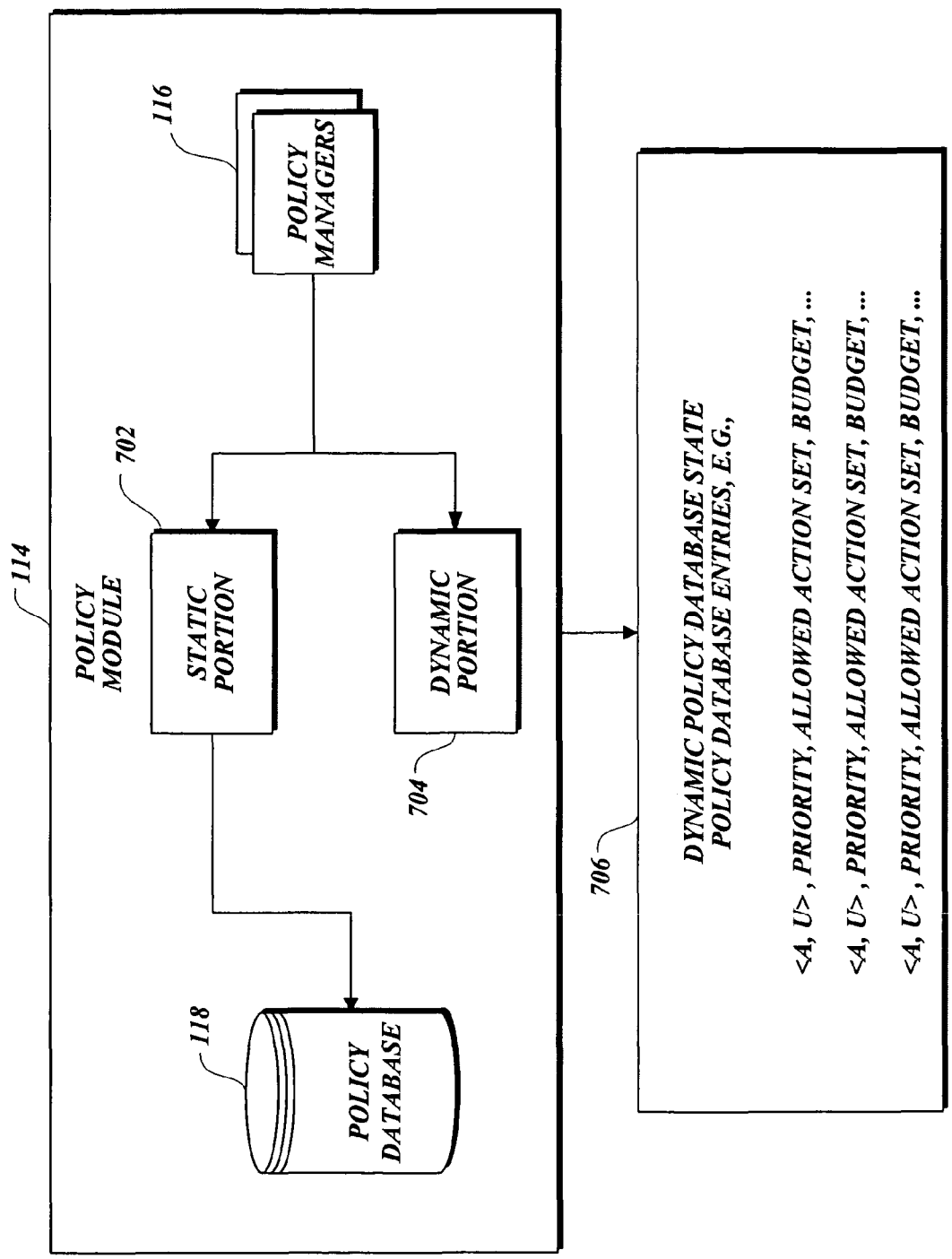
FIG. 7 is a block diagram depicting in further detail an arrangement of certain components of the policy module illustrated in FIG. 1 for implementing an embodiment of the present invention.

FIG. 7 is a block diagram depicting in further detail an arrangement of certain components of the policy module 114 illustrated in FIG. 1 for implementing an embodiment of the present invention. As shown, the policy module 114 comprises, among other components, a policy database 118, and one or more policy managers 116. The policy is expressed in at least one of a static portion 702 and a dynamic portion 704, which together comprise the dynamic policy database state 706 that the resource manager 108 and resource providers 112 use in making their determinations to admit or deny requests to reserve and allocate resources. The static portion 702 generally represents the information that is recorded in the policy database 118, and the dynamic portion 704 generally represents the information that is generated at the time that a process or thread is created, such as the limits L 208, the reservations R 210, and the committed resources C 212 maintained in the active budget objects 700.

As shown in the illustrated embodiment in FIG. 7, the dynamic policy database state 706 may comprise policy database entries that are identified by a unique <application ID, user ID> (<A, U>) tuple. As processes or threads 202, 204, are launched or created, they are mapped to an <A, U> tuple. Each <A, U> tuple may include an indication of the relative priority and the allowed action set for the mapped processes and threads. The data entries may also identify the budget or budgets 104 that may be actively associated with the processes and threads mapped to the <A, U> tuple.

In a typical embodiment, the allowed action set describes the set of actions that are considered acceptable in the course of arbitrating a resource conflict. For any <A, U> tuple that is not at the highest priority level, at least one such action must be specified. As described earlier, the allowed actions may range in severity from passive, to pro-active, to aggressive. Example actions include requesting that a client 102 cede resources (with timeout), transparently reclaiming reserved resources, reclaiming allocated resources, requesting that the client 102 save state and move to a quiescent state, or forcibly terminating the client to reclaim the resources in contention. If no actions are specified in the allowed action set, then any process or threads mapped to the corresponding <A, U> tuple are immune to all resource arbitration actions and are considered to be of infinite priority.

Among other uses, the dynamic policy database state 706 aids the resource manager 108 in the resolution of any conflicts that may arise as a result of an allocation failure and subsequent arbitration request from a resource provider 112. In suggesting a potential course of action to a resource provider 112, the dynamic policy database state 706 advantageously enables the resource manager 108 to significantly improve upon the first-come, first-served allocation policies found in contemporary versions of WINDOWS and other operating systems.

Another aspect of the policy module 114 is to store information in the policy database 118 that describes in advance the resource requirements and or limitations of a particular client 102. In one embodiment, the operating system may query and utilize this stored information to ensure that a process or thread, 202, 204, executing on behalf of the client 102 begins its existence subject to the relevant resource requirements and restrictions contained in an appropriate budget 104 or budget hierarchy 300. The requirements and restrictions are applied at process creation time to prevent the process or thread 202, 204, from executing outside the requirements and restrictions specified in the policy module 114. The policy managers 116 may take advantage of this feature to, among other things, isolate potentially rogue applications (clients) or ensure that certain clients can startup only if the operating system can reserve a set of required resources in advance.

Figure 8:
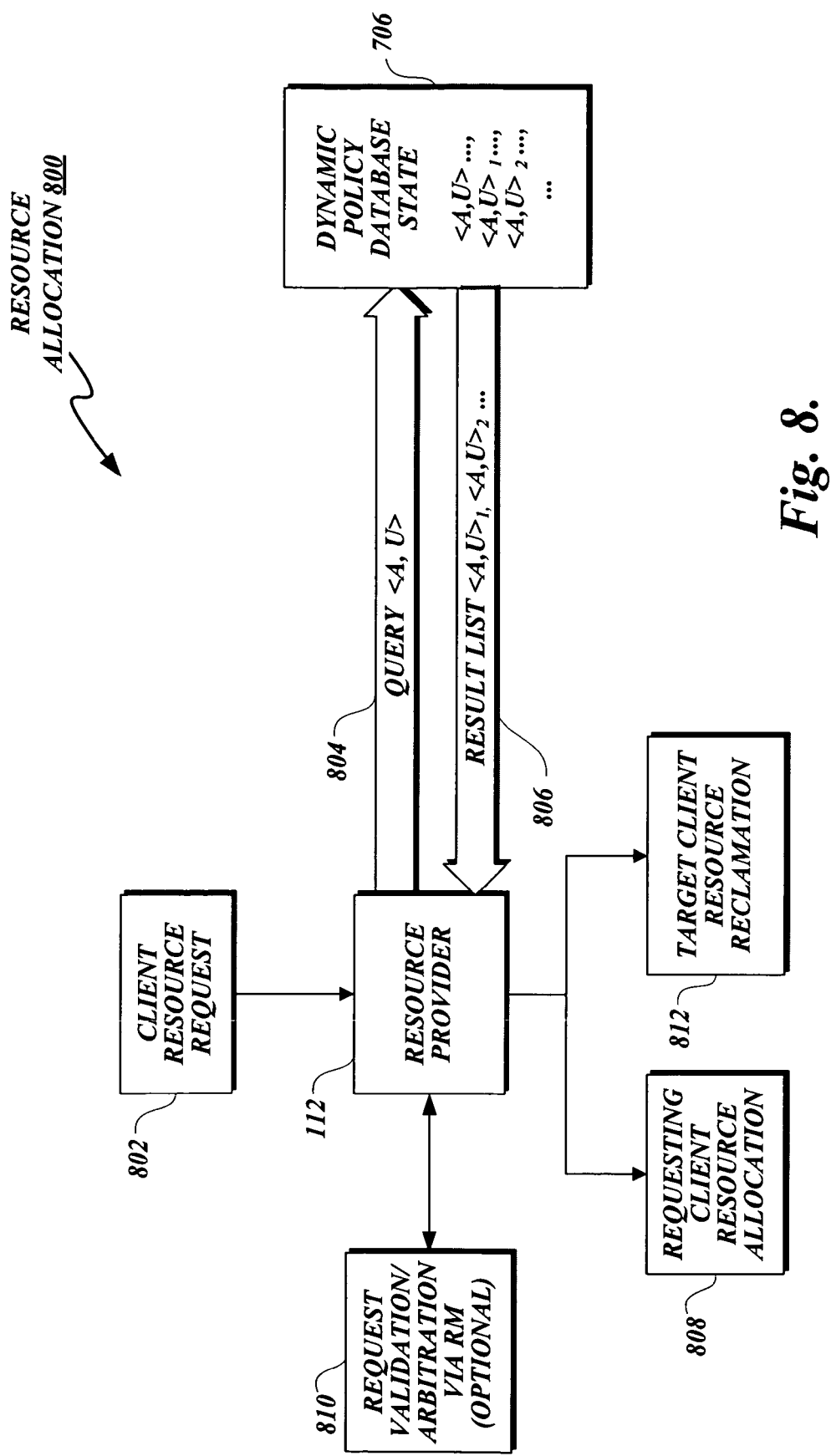
FIG. 8 is a block diagram depicting in further detail the interaction between the resource provider and certain components of the resource management system illustrated in FIG. 1 to allocate resources in accordance with an embodiment of the present invention.

FIG. 8 is a block diagram depicting in further detail the interaction between the resource provider and certain components of the resource management system illustrated in FIG. 1 to allocate resources 800 in accordance with an embodiment of the present invention. As shown, a client resource request 802 is issued to the responsible resource provider 112, which in turn determines whether it can satisfy the request and perform the requesting client resource allocation 808, or whether to participate in the resource management system 100 by generating a request for validation 810 of the client resource request 802 via the resource manager 108. Alternatively, or in addition, in those cases where the resource provider 112 cannot satisfy the client resource request 802 due to resource contention, the resource provider may further participate in the resource management system 100 by generating a request for arbitration 810 from the resource manager 108, and subsequently performing target client resource reclamation 812 in accordance with the result of the arbitration request 810.

In a typical embodiment, the requests for validation and arbitration 810 may be implemented in the form of a query 804 specifying the <A, U> tuple corresponding to the client that issued the resource request 802. The query 804 is applied against the dynamic policy database state 706, and a result list 806 is returned containing a list of the processes or threads whose corresponding <A, U> tuples are of priority less than the specified <A, U> tuple. In a typical embodiment, the resource provider 112 may optionally supply with the query 804 a list of processes (or threads) currently using the resource in question so that the result list 806 retrieved from the dynamic policy database state 706 may be appropriately trimmed to a reasonable number of entries.

Figure 9:
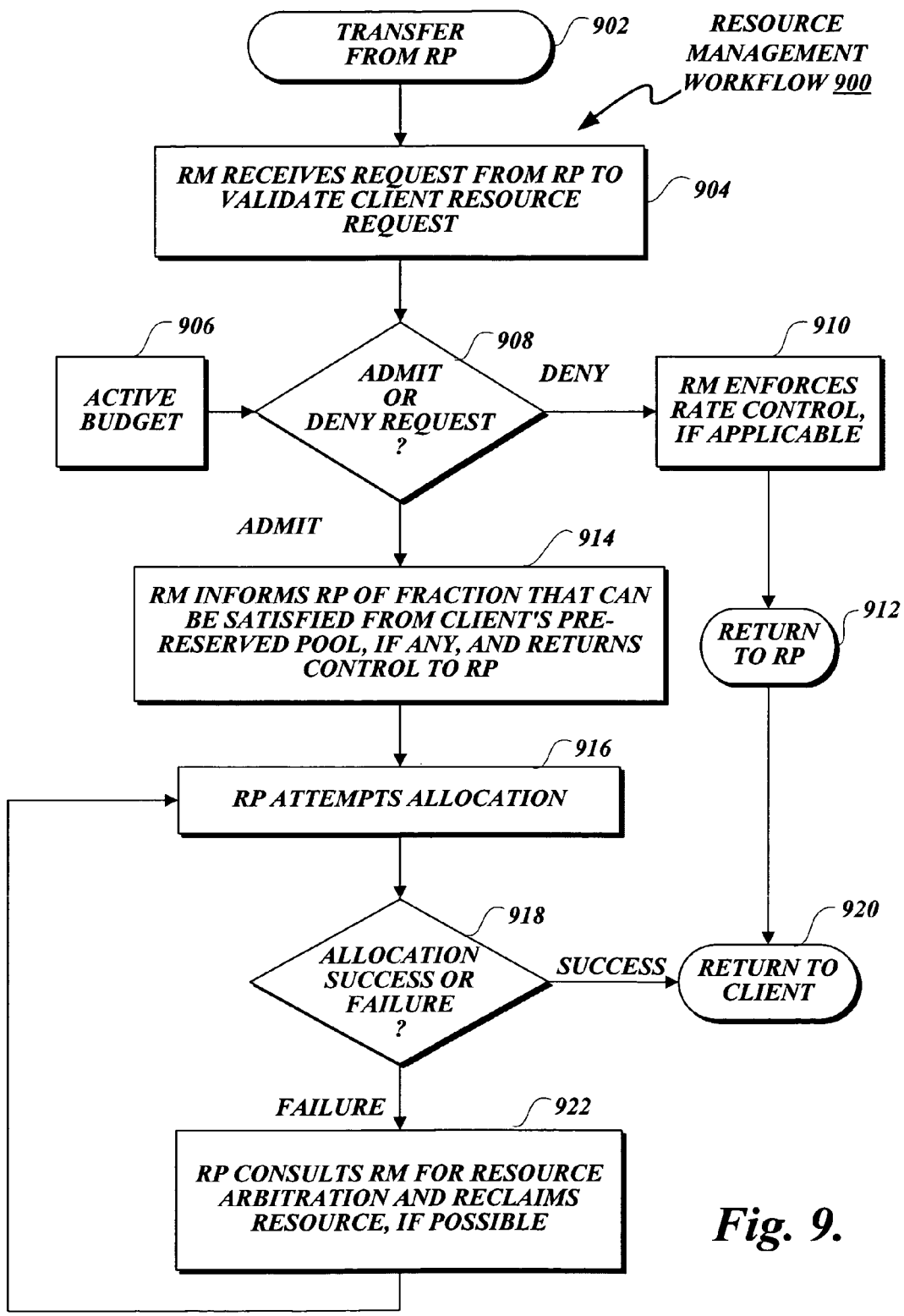
FIG. 9 is a flow diagram illustrating the logic performed for managing resources in accordance with an embodiment of the present invention.

FIG. 9 is a flow diagram illustrating the resource management workflow 900 of a method for managing resources in accordance with an embodiment of the present invention. The resource management workflow 900 will be described with reference to the foregoing descriptions of the various components of a resource management system 100, including, among others, the resource manager 108, the resource providers 112, the budgets 104 and budget hierarchies 300 and their respective budgeted values, and the policy module 114.

The workflow 900 includes a process 902 to transfer control from a resource provider 112 to the resource manager 108 prior to allocating a resource, followed by a process 904 in which the resource manager 108 receives from the resource provider 112 a request to validate a client's resource reservation or allocation request. The resource manager 108 commences validation at decision block 908, at which time the resource manager 108 consults the active budget 906 associated with the allocation request, i.e., the active budget 104 associated with the process or thread 202, 204, that initiated the request. As described with reference to FIGS. 3A-3B, the resource manager 108 enforces the current budget limit L 208, reservation R 210, and commit C 212 values in the active budget 104 and any budget hierarchy 300 of which the active budget is a part. In so doing, the resource manager 108 may deny the request, should the request exceed the budgeted values. In that case, at process 910, the resource manager 108 may enforce rate-control, if the resource provider 112 has requested rate control, or may return control to the resource provider 112 at process block 912, which in turn returns control to the client at process 920 denying the client's resource reservation or allocation request.

Should the request fall within the budgeted values, the resource manager 108 may admit the request. At process block 914, the resource manager 108 may further inform the resource provider 112 of the portion of a client's allocation request that can be satisfied from the client's pre-reserved pool. Control is returned to the resource provider 112 at process block 916, after which the resource provider 112 may attempt to allocate the resource as needed by the requesting client. At decision block 918, should the allocation succeed, then, at process 920, control may be returned to the requesting client. Otherwise, should the allocation fail, then resource contention has occurred. At this point, at process block 922, the resource provider 112 may optionally consult the resource manager 108 for resource arbitration, and reclaim resources where possible in accordance with such arbitration as previously described with reference to FIG. 6. Once sufficient resources have been reclaimed, the resource management workflow 900 may resume at process block 916 to retry the allocation request in the same manner as previously described.

Figure 10:
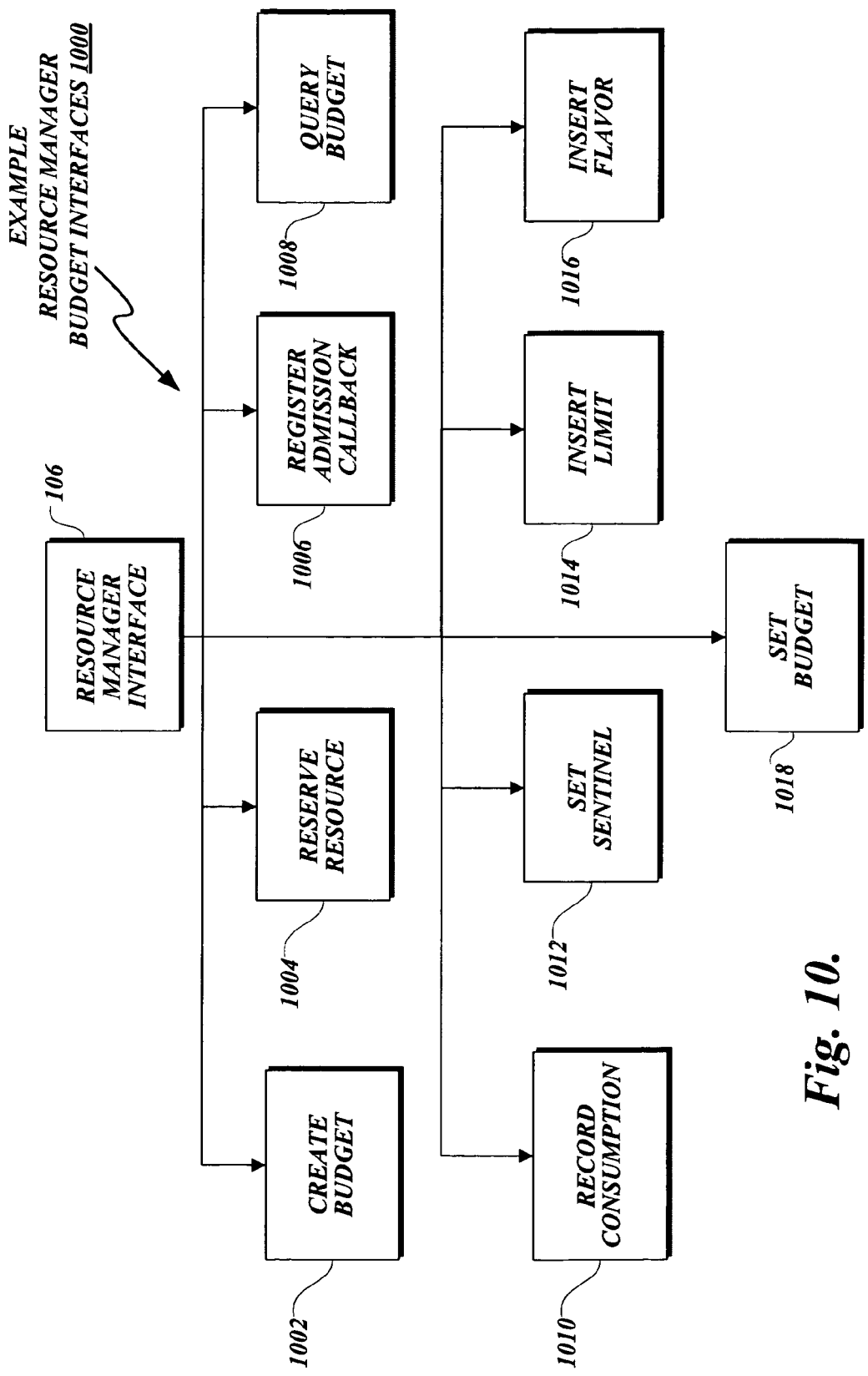
FIG. 10 is a block diagram overview of example resource manager budget interfaces formed in accordance with an embodiment of the present invention.

FIG. 10 is a block diagram overview of example resource manager budget interfaces 1000 that may be used to implement an embodiment of the invention. Table 1 below summarizes the interfaces and their intended audience. A brief discussion of each interface follows the table.

TABLE 1

| Interface | Intended Audience |
| --- | --- |
| create budget (1002) | Policy managers (116), clients (102) |
| reserve resource (1004) | Policy managers (116), clients (102) |
| register admission callback (1006) | Resource providers (112) |
| query budget (1008) | Policy managers (116), clients (102), resource providers (112) |
| record consumption (1010) | Resource providers (112) |
| set sentinel (1012) | Policy managers (116), clients (102) |
| insert limit (1014) | Services, policy managers (116) |
| insert flavor (1016) | Clients (102), services, drivers, policy managers (116) |
| set budget (1018) | Policy managers (116), clients (102) |

In one embodiment, the create budget interface 1002 may be used by policy managers 116 and clients 102 to create and manipulate budgets 104 and budget hierarchies 300. In a typical embodiment, the budgets 104 are created as budget objects 200, as previously described with reference to FIG. 2. The default behavior of the interface 1002 may automatically link the newly created budget object 200 to the caller's currently active budget to form part of a budget hierarchy 300. In one embodiment, the caller may override the default behavior by optionally specifying a parameter that indicates the desire to "escape" the current hierarchy. By escaping the current hierarchy, a budget 104 effectively becomes its own root budget. Such a maneuver would release the budget from the constraints present elsewhere in the current budget hierarchy.

In most instances, clients 102 will not manage the creation of their own budgets 104, as manually doing so would be difficult, error-prone, and burdensome. Rather, the task of budget creation is left to a human or software service acting as administrator with both the knowledge and authority to execute it correctly, using a policy manager 116. In that case, the policy manager 116 may use the create budget interface 1002 to create the budget at the same time the process or thread 202, 204, with which the budget may be associated is created. The data used to generate a budget (e.g., what parameters should be used to populate the budget limit L 208, which reservations to perform in advance, etc.) may be garnered from the policy database 118 or from automated administration software using heuristics to tune system behavior. In a typical embodiment, the policy database 118 may be populated in advance upon consideration of the availability of resources, the nature of the client, and user preferences.

Generally, no resource is committed or reserved in a budget 104 when it is initially created using the create budget interface 1002. Therefore, budgets which require pre-population (to achieve machine partitioning and isolation) are typically first created by a policy manager 116 using the create budget interface 1002, and then passed to a reserve resource interface 1004 to accomplish the necessary reservations, as will be next described.

A budget 104 may be dynamically associated with process groups, processes, or (possibly) threads at process creation time. For example, in one embodiment, once created using the create budget interface 1002, a budget 104 may be passed as an argument to a routine that handles process (or thread) creation, such that the new process (or thread) is automatically associated with, and therefore subject to, the resource restrictions specified in the budget.

The create budget interface 1002 may be used to externally partition resource usage by specifying a parameter indicating one or more flavors at the time of budget creation. In the absence of such an indication, the default behavior of the create budget interface 1002 may be to create budgets having a single neutral flavor against which all resource usage is charged. Alternatively, or in addition, one or more flavors may be dynamically inserted into the budget following its creation as described with reference to the insert flavor interface 1016 below. This is in addition to the client's use of flavors to internally partition resource usage, for example to limit exhaustion of resources by a particular task or to reserve resources for use in recovering from errors.

In one embodiment, a reserve resource interface 1004 may be used by a client 102 to reserve one or more resources for future use. In this manner, a transactional means of acquiring resources is imposed on clients 102 in order to avoid deadlock conditions involving the ordering of resource acquisition. However, this is primarily an aid to the client 102; if the client so desires, the interface 1004 may be called multiple times to reserve resources independently, or over time. Since reserving a resource generally makes that amount of resource unavailable system-wide, reservations are typically conservative in nature. Soft limits may be used to ameliorate the potential for overuse of reservations and to avoid the underutilization of resources.

In a typical embodiment, once the reservation has been successfully made, the reservation value R 210 is updated to reflect the reservation, and the client 102 may commit up to this amount of the resource, as represented in the budget's commit value C 212, without the need for resource arbitration; it may commit up to the limit L 208 at the normal service level. When the limit L 208 of the budget is a soft limit, the client 102 may commit resource in excess of the limit L at a degraded service level, such that the system may efficiently reclaim it for other Cn allocations in the future.

In one embodiment, the reserve resource 1004 interface provides a means to validate the reservation request, i.e., to admit or deny the reservation request in the context of the currently active budget and applicable budget hierarchy 300, if any. The actual reservation of the corresponding resource is typically handled separately by the resource provider 112 itself. In this manner two levels of control upon resource requests are enforced, one by the resource manager 108 in accordance with the currently active budget and budget hierarchy, if any, and one by the resource provider 112. Thus, a reservation request that may be admissible in terms of the currently active budget and budget hierarchy may fail when presented to the appropriate resource provider 112, and likewise, a reservation request that would have been deemed acceptable by a resource provider 112 may be preemptively denied by the resource manager 108.

Once the reserve resource interface 1004 is used to validate a particular reservation request in the context of the applicable budget hierarchy 300, the responsibility of determining whether the actual resource reservation can be satisfied, i.e., allocated, given all outstanding reservations, falls upon the resource provider 112. Accordingly, a register admission callback 1006 interface may be provided so that the resource manager 108 can confirm whether the client's reservation request was or was not granted by the resource provider 112. Reservation requests that have been granted render that portion of the resource unavailable for normal commit Cn use by other clients 102. Therefore, when the request is granted, the resource manager 108 updates the appropriate budget or budgets in the budget hierarchy 300 to accurately reflect the current state of outstanding resource reservations.

In one embodiment, a query budget interface 1008 may be used by a client 102 to examine specific restrictions and requirements maintained in their budget 104. For example, the ability to query a budget may be particularly useful for clients 102 that inherit a budget or have an externally assigned budget. By examining the current state of their budgets, the clients may make an informed decision on how to adjust their resource usage to stay within their budgets. For example, after querying their budget, a client 102 may wish to register with the resource manager 108 and resource providers 112 to receive notifications that a desired resource has become available, and the like. As another example, rather that waiting to receive a notification, the client 102 may decide instead to modify their budget as they deem necessary in an effort to more quickly obtain the resources that they need (assuming that they have sufficient authority to do so). As a further example, resource managers 108 may use notifications to request that cooperating clients reduce their resource consumption by reducing the sizes of their cached information or changing the set of algorithms being used to tradeoff space vs. time or time vs. space. Resource managers may further adjust the limits in budgets to keep the system from running too short on resources.

A record consumption interface 1010 may be provided to resource providers 112 to track the consumption of resources over time. In one embodiment, each resource provider 112 participating in the resource management system 100 is responsible for invoking the record consumption 1010 interface after the allocation of a supported resource to a client 102, i.e., after the resource is committed. The resource manager 108 may then track the committed resource value (Cn) in order to facilitate any possible future resource manager decisions aimed at reclaiming resources. In contrast, tracking and managing which portion of the committed resource may be classified as excess commit Ce is typically left to the resource provider 112 as described below with reference to surplus amounts.

In a typical embodiment, the use of the record consumption interface 1010 to track the consumption of a resource does not require that the amount have been reserved in advance, e.g., by using the reserve resource interface 1004. When a resource is available, it is, by default, implicitly "reserved" at the time it is allocated to the client 102. Should enforcing the currently active budget prohibit the resource manager 108 from admitting the full amount of the recorded consumption as part of the normal commit Cn, the record consumption interface 1010 may report back the surplus amount to the resource provider 112. In that case, resource providers 112 that support soft limits may optionally disburse the surplus amount to the client as excess commit Ce, assuming the client 102 has indicated that excess commit Ce resource is acceptable. Since excess commit Ce resources may be more readily reclaimed then normal commit Cn some clients may prefer to forego excess commit and wait until resources that can be allocated at normal commit are available. In the case of most implicitly consumed resources, the associated resource provider 112 typically has considerable flexibility in managing excess commit Ce allocations of resources.

In a typical embodiment, the resource provider 112 specifies in the record consumption interface 1010 the identity of the resource being charged. In this manner, the resource manager 108 is able to charge the consumption to the correct resource. Further, the resource manager 108 may also determine whether a dynamic limit needs to be inserted into the budget using the insert limit interface 1014, as in the case of certain dynamically introduced resources as will be described in further detail below.

A set sentinel interface 1012 may be provided to policy managers 116, clients 102, and services to register for a one-time notification when the normal commit Cn value tracked for a particular budget 104 has exceeded the budget's sentinel value 214. Should additional notifications be desired, the policy managers 116 and clients 102 may explicitly re-register using the set sentinel interface 1012. In one embodiment, the registrant may specify the desired method of notification delivery, which will include at least all of the notification mechanisms supported by resource manager 108, as generally described with reference to FIG. 5. As an example, sentinel-based notification may be useful to change a resource billing model once the resource consumption exceeds the budget's sentinel value.

An insert limit interface 1014 may be provided to policy managers 116 to dynamically insert limits L 208 into budgets 104. For example, when resources are consumed by a service operating on behalf of a client as described with reference to FIG. 4, services may insert limits in the client's active budget to control the rate at which a client can force a service to deplete the latter's resources through the use of the insert limit interface 1014. On subsequent invocations, the client 102 will be subjected to the dynamically inserted limit. In a typical embodiment, only trusted policy managers 116 and services may possess the requisite privilege to perform a dynamic limit insertion into a target budget, as maliciously inserting low limits into client budgets may constitute a denial of service attack.

An insert flavor interface 1016 may be provided to clients 102, including services and drivers operating on behalf of clients, to dynamically insert flavors into budgets 104 as previously described with reference to FIG. 4. In one embodiment, a client 102 may use the insert flavor interface 1016 to perform flavor insertion on its own currently active budget. Dynamic flavor insertion into budgets belonging to different clients may defeat the purpose of flavors, which are generally intended to provide clients a means of managing their own resource use within the constraints imposed by their own budget. To avoid this difficulty internal and external partitioning of resources using flavors must rely on distinct sets of flavors.

In the example introduced in FIG. 4, a service may use the insert flavor interface 1016 to delineate a flavor (partitioning) of its budget based on the identification of a particular client 102 on whose behalf it is operating. Establishing a mapping between the client 102 and flavor is left entirely to the service. A similar scenario may be employed by drivers that would like to ration their resource usage based on the particular client on whose behalf resources are being consumed. Thus the burden of flavor management falls upon the service or driver that chooses to dynamically insert them using the insert flavor interface 1016.

Alternatively, or in addition, in cases where there is no need for dynamic flavors, such as network drivers wishing to partition their allowed memory usage between a pre-defined static set of packet types, flavors need not be dynamically specified using the insert flavor interface 1016. Rather, the desired flavors can be specified at budget creation time using the create budget interface 1002, possibly yielding a performance benefit.

Flavors are also useful for implementing error recovery and improving software robustness and reliability. By reserving resources with a flavor used only for recovering from low-resource situations in a system, software can still function sufficiently to recover. For example a client needs enough resources available to respond to a resource manager 108 notification that it should reduce resource consumption by shrinking caches.

Lastly, a set budget interface 1016 may be provided to services and other components to, among other uses, temporarily attach a process or thread 202, 204 executing on behalf of a client 102 to a particular budget 104, such as described with reference to the client resource-identity impersonation scenario in FIG. 4. For the duration of the attach operation, all of the service's resource usage may be charged to a specified budget. In cases in which a resource is reserved, allocated and released during the period of attachment, the set budget interface 1016 provides a way for services performing operations directly on behalf of a requesting client to charge resource consumption against the client's budget, and not their own.

The foregoing discussion has been intended to provide a brief, general description of a computing system suitable for implementing various features of the invention. Although described in the general context of a personal computer usable in a distributed computing environment, in which complementary tasks may be performed by remote computing devices linked together through a communication network, those skilled in the art will appreciate that the invention may be practiced with many other computer system configurations. For example, the invention may be practiced with a personal computer operating in a standalone environment, or with multiprocessor systems, minicomputers, mainframe computers, and the like. In addition, those skilled in the art will recognize that the invention may be practiced on other kinds of computing devices including laptop computers, tablet computers, personal digital assistants (PDAs), cell phones, game consoles, personal media devices, or any device upon which computer software or other digital content is installed.

For the sake of convenience, some of the description of the computing system suitable for implementing various features of the invention included references to the WINDOWS operating system. However, those skilled in the art will recognize that those references are only illustrative and do not serve to limit the general application of the invention. For example, the invention may be practiced in the context of other operating systems such as the LINUX or UNIX operating systems.

Certain aspects of the invention have been described in terms of programs executed or accessed by an operating system in conjunction with a personal computer. However, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

The embodiments of the invention in which an exclusive property or privilege is claimed are defined as follows:

1. A method for facilitating the efficient management of resources for a plurality of clients in a computer system, the method comprising:

tracking a first set of values related to use of a resource by at least one first client among the plurality of clients, the first set of values including a first limit representing a maximum amount of the resource that can be allocated to the at least one first client and a first commit representing an amount of the resource already allocated to the at least one first client;

tracking a second set of values related to use of the resource by at least one second client among the plurality of clients, the second set of values including a second limit representing a maximum amount of the resource that can be allocated to the at least one second client and a second commit representing an amount of the resource already allocated to the at least one second client;

hierarchically relating the first set of values and the second set of values as children of a root set of values, the root set of values including a root limit representing a maximum amount of the resource that can be allocated to the plurality of clients;

receiving a request by a provider of the resource to validate a client request to allocate an amount of the resource to the at least one first client;

computing an aggregated commit, the computing comprising summing a plurality of commits including the first commit and the second commit;

when the root limit is a hard limit and the first limit is a hard limit, validating the client request if increasing the first commit by the requested amount does not cause the first commit to exceed the first limit and increasing the aggregated commit by the requested amount does not cause the aggregated commit to exceed the root limit;

when the root limit is a hard limit and the first limit is a soft limit,
if increasing the first commit by the requested amount causes the first commit to exceed the first limit by a surplus amount of the resource and increasing the aggregated commit by the requested amount does not cause the aggregated commit to exceed the root limit, validating the client request by allocating to the at least one first client the requested amount of the resource including the surplus amount of the resource, wherein the surplus amount of the resource is allocated to the at least one first client at a reduced service level so that the surplus amount of the resource can be reclaimed without cooperation from the at least one first client; and when the root limit is a soft limit and the first limit is a soft limit,
if increasing the first commit by the requested amount causes the first commit to exceed the first limit by a first surplus amount of the resource and increasing the aggregated commit by the requested amount causes the aggregated commit to exceed the root limit by a second surplus amount of the resource, validating the client request by allocating to the at least one first client the requested amount of the resource including surplus amount of the resource comprising the first surplus amount and the second surplus amount of the resource, wherein the surplus amount of the resource is allocated to the at least one first client at the reduced service level.

2. The method of claim 1, further comprising:
receiving a confirmation from the provider of the resource that the requested amount has been allocated to the at least one first client; and
increasing the first commit by the requested amount.

3. The method of claim 2, wherein, when the root limit is the soft limit and when the first limit is the soft limit; and further wherein increasing the first commit by the requested amount includes increasing a normal commit up to the first limit; and the method further comprising:
  reporting the surplus amount in excess of the first limit to the provider of the resource as an excess commit, wherein the normal commit represents an amount allocable to the at least one first client at a normal service level, and the excess commit represents an amount allocable to the at least one first client at the reduced service level.

4. The method of claim 1, wherein the first set of values further include a first reservation representing a maximum amount of the resource that can be pre-allocated to the at least one first client, the first reservation being bounded by the first limit;
  the method further comprising:
    receiving a request by a provider of the resource to validate a client request to pre-allocate an amount of the resource to the at least one first client; and
    validating the client request if increasing the first commit by the requested amount will not cause the first commit to exceed the first reservation.

5. The method of claim 4, further comprising:
  receiving a confirmation from the provider of the resource that the requested amount has been pre-allocated to the at least one first client; and
  increasing the first commit by the requested amount.

6. The method of claim 1, wherein the use of the resource is further subject to a flavor restriction, the flavor restriction based on a type of the use of the resource; and further wherein the client request is validated if the client request does not cause the at least one first client's use of the resource to exceed the flavor restriction for the type of use of the resource.

7. The method of claim 1, further comprising:
  receiving a request by the provider of the resource to arbitrate a client request for the resource;
  determining a relative priority and at least one allowed action for a target client to which the resource is currently allocated; and
  arbitrating in favor of the requesting client when the resource can be reclaimed from the target client based on the relative priority and the at least one allowed action.

8. The method of claim 7, wherein determining the relative priority and the at least one allowed action for the target client includes generating a query to a policy database.

9. The method of claim 7, further comprising:
  notifying the target client from which the resource can be reclaimed to voluntarily cede the resource.

10. The method of claim 7, wherein the at least one allowed action is one of a passive action, a pro-active action, and an aggressive action.

11. A system for managing resources for a plurality of clients in a computing device, the system comprising:
  a hierarchy encoding hierarchically related restrictions on a resource, the hierarchically related restrictions comprising a first limit on at least one first client among the plurality of clients, and a root limit on the plurality of clients, wherein the first limit is a child of the root limit in the hierarchy;
  a process operating on behalf of the at least one first client;
  a resource manager for validating a client request by determining whether an amount of the resource is to be allocated to the at least one first client based on the restrictions encoded in the hierarchy, the validating comprising:
    determining an aggregated amount of the resource allocated to the plurality of clients,
    when the root limit is a hard limit and the first limit is a hard limit, validating the client request by determining that an amount of the resource allocated to the at least one first client, if increased by the requested amount, does not exceed the first limit, and determining that the aggregated amount of the resource, if increased by the requested amount, does not exceed the root limit,
    when the root limit is a hard limit and the first limit is a soft limit, validating the client request by:
      determining that the amount of the resource allocated to the at least one first client, if increased by the requested amount, exceeds the first limit by an excess amount,
      determining that the aggregated amount of the resource, if increased by the requested amount, does not exceed the root limit, and
      determining that the requested amount of the resource comprising the excess amount of the resource is allocable to the at least one first client, wherein the excess amount of the resource is allocable to the at least one first client at a reduced service level so that the excess amount of the resource can be reclaimed without cooperation from the at least one first client, and
    when the root limit is a soft limit and the first limit is a soft limit, validating the client request by:
      determining that the amount of the resource allocated to the at least one first client, if increased by the requested amount, exceeds the first limit by a first excess amount of the resource,
      determining that the aggregated amount of the resource, if increased by the requested amount, exceeds the root limit by a second excess amount of the resource, and
      determining that the requested amount of the resource including excess amount of the resource comprising the first excess amount and the second excess amount is allocable to the at least one first client, wherein the excess amount of the resource is allocable to the at least one first client at a reduced service level so that the excess amount of the resource can be reclaimed without cooperation from the at least one first client.

12. The system of claim 11, wherein, when the root limit comprises the hard limit, the resource manager is further configured to invalidate the request if allocating the requested amount of the resource to the process would cause the at least one first client to exceed the first limit or exceed the root limit for the resource.

13. The system of claim 11, wherein, when the root limit comprises the soft limit, the restrictions further include a commitment representing an amount of the resource already allocated to the at least one first client, the commitment including a normal commitment representing the amount allocated within the first limit, and an excess commitment representing the excess amount allocated in excess of the first limit, wherein the resource manager validates the client request if the requested amount added to the normal commitment is within their budgeted limit for the resource.

14. The system of claim 13, wherein the restrictions further include a reservation representing a maximum amount of the resource that can be pre-allocated to the at least one first client by the resource provider, the reservation being constrained by the first limit, and further wherein the resource manager validates the client request if pre-allocating the requested amount of the resource to the process would not cause the at least one first client to exceed their budgeted reservation for the resource, and invalidates the request if pre-allocating the requested amount of the resource to the process would cause the at least one first client to exceed their budgeted reservation for the resource.

15. The system of claim 13, wherein the restrictions in the hierarchy are aggregated up the hierarchy to provide a maximum amount of the resource that can be allocated to all clients of budgets within a subtree of the hierarchy, further subject to the maximum amount of the resource that can be allocated to all clients of all budgets within the hierarchy.

16. The system of claim 12, further comprising:
a policy module providing at least one of a relative priority and an allowed action for target clients to which the resource is currently allocated; and
wherein the resource manager arbitrates the client request by arbitrating in favor of the requesting client when the resource can be reclaimed from at least one of the target clients to which the resource is currently allocated based on the at least one of the relative priority and the allowed action.

17. The system of claim 16, wherein the allowed action is one of a passive action, a pro-active action, and an aggressive action.

18. A computer-readable storage medium having instructions for managing resources in a computing device, the instructions comprising:
encoding limits on allocating resources to clients into a hierarchy, the limits representing a maximum amount of the resource that can be allocated to the clients;
identifying an active limit associated with a client making a request for a restricted resource, the active limit at a level within the hierarchy, the active limit having a parent limit at a next higher level in the hierarchy;
approving the request if allocating the resource to the client would not cause the client to exceed the active limit, the parent limit, and any higher parental limits within the hierarchy up to and including a root limit;
when the root limit comprises a hard limit and the active limit comprises a soft limit, approving the request if allocating the resource to the client would cause the client to exceed the active limit by an excess amount of the resource and would not cause the client to exceed the root limit, wherein the excess amount of the resource is allocated to the client at a degraded service level so that the excess amount can be reclaimed without cooperation from the client; and
when the root limit comprises a soft limit and the active limit comprises a soft limit, approving the request if allocating the resource to the client would cause the client to exceed the active limit by a first excess amount of the resource and would cause the client to exceed the root limit by a second excess amount of the resource, wherein an excess amount of the resource comprising the first excess amount and the second excess amount is allocated to the client at a degraded service level so that the excess amount can be reclaimed without cooperation from the client.

19. The computer-readable storage medium of claim 18, the instructions further comprising:
identifying target clients to which the resource is currently allocated;
obtaining a relative priority and allowed action set associated with each of the identified target clients; and
arbitrating the client request by reclaiming the resource from at least one of the target clients in accordance with the associated relative priorities and allowed action sets.

20. The method of claim 1, wherein:
the second set of values further comprises a second limit representing a maximum amount of the resource that can be allocated to the at least one second client; and
the sum of the first limit and the second limit is less than the root limit.

* * * * *